(12) United States Patent
Gopal et al.

(10) Patent No.: US 10,089,500 B2
(45) Date of Patent: Oct. 2, 2018

(54) SECURE MODULAR EXPONENTIATION PROCESSORS, METHODS, SYSTEMS, AND INSTRUCTIONS

(71) Applicant: INTEL CORPORATION, Santa Clara, CA (US)

(72) Inventors: Vinodh Gopal, Westborough, MA (US); Gilbert M. Wolrich, Framingham, MA (US)

(73) Assignee: Intel Corporation, Santa Clara, CA (US)

( * ) Notice: Subject to any disclaimer, the term of this patent is extended or adjusted under 35 U.S.C. 154(b) by 145 days.

(21) Appl. No.: 14/866,334

(22) Filed: Sep. 25, 2015

(65) Prior Publication Data

US 2017/0091488 A1    Mar. 30, 2017

(51) Int. Cl.
| | | |
|---|---|---|
| H04L 29/00 | (2006.01) | |
| G06F 21/72 | (2013.01) | |
| G06F 9/30 | (2018.01) | |
| H04L 9/08 | (2006.01) | |

(52) U.S. Cl.
CPC ............ *G06F 21/72* (2013.01); *G06F 9/3001* (2013.01); *G06F 9/3016* (2013.01); *G06F 9/30178* (2013.01); *H04L 9/0841* (2013.01)

(58) Field of Classification Search
CPC ..... G06F 21/72; G06F 9/30178; H04L 9/0841
USPC .......................................................... 713/190
See application file for complete search history.

(56) References Cited

U.S. PATENT DOCUMENTS

| | | |
|---|---|---|
| 7,739,521 B2 | 6/2010 | Brickell |
| 7,925,011 B2 | 4/2011 | Gopal et al. |
| 7,961,877 B2 | 6/2011 | Gopal et al. |
| 8,112,066 B2 * | 2/2012 | Ben Ayed ............ G06Q 20/108 455/41.1 |
| 8,290,149 B2 | 10/2012 | Brickell |
| 8,799,343 B2 | 8/2014 | Gueron et al. |
| 9,014,368 B2 | 4/2015 | Teglia |

(Continued)

FOREIGN PATENT DOCUMENTS

WO     WO 2017/052811     3/2017

OTHER PUBLICATIONS

International Preliminary Report on Patentability for PCT Patent Application No. PCT/US2016/045980 dated Apr. 5, 2018, 10 pages.

(Continued)

*Primary Examiner* — Brandon Hoffman
*Assistant Examiner* — Michael D Anderson
(74) *Attorney, Agent, or Firm* — Alliance IP, LLC

(57) ABSTRACT

A processor of an aspect includes a decode unit to decode a modular exponentiation with obfuscated input information instruction. The modular exponentiation with obfuscated input information instruction is to indicate a plurality of source operands that are to store input information for a modular exponentiation operation. At least some of the input information that is to be stored in the plurality of source operands is to be obfuscated. An execution unit is coupled with the decode unit. The execution unit, in response to the modular exponentiation with obfuscated input information instruction, is to store a modular exponentiation result in a destination storage location that is to be indicated by the modular exponentiation with obfuscated input information instruction. Other processors, methods, systems, and instructions are disclosed.

25 Claims, 15 Drawing Sheets

(56) References Cited

U.S. PATENT DOCUMENTS

| | | |
|---|---|---|
| 9,092,645 B2 | 7/2015 | Ozturk et al. |
| 2005/0002532 A1 | 1/2005 | Zhou et al. |
| 2005/0084098 A1 | 4/2005 | Brickell |
| 2008/0019512 A1 | 1/2008 | Gueron et al. |
| 2008/0147768 A1 | 6/2008 | Gopal et al. |
| 2009/0193250 A1* | 7/2009 | Yokota ............... H04L 9/3255 |
| | | 713/156 |
| 2011/0064215 A1 | 3/2011 | Michiels et al. |
| 2012/0102307 A1* | 4/2012 | Wong ..................... G06F 21/10 |
| | | 713/2 |
| 2013/0279692 A1 | 10/2013 | Bevan |
| 2014/0157002 A1 | 6/2014 | Grobman et al. |
| 2015/0006968 A1 | 1/2015 | ShanBhogue et al. |
| 2015/0161408 A1 | 6/2015 | ShanBhogue et al. |
| 2016/0380772 A1 | 12/2016 | Gopal et al. |
| 2017/0093567 A1 | 3/2017 | Gopal et al. |

OTHER PUBLICATIONS

International Search Report and Written Opinion received for PCT Patent Application No. PCT/US2016/045980, dated Mar. 24, 2017, 13 pages.

\* cited by examiner

FIG. 2

METHOD IN
PROCESSOR
OF PERFORMING
MODULAR
EXPONENTIATION
INSTRUCTION
230

RECEIVE MODULAR EXPONENTIATION WITH
OBFUSCATED INPUT INFORMATION INSTRUCTION
INDICATING SOURCE OPERAND(S) STORING INPUT
INFORMATION FOR A MODULAR EXPONENTIATION
OPERATION, WHERE AT LEAST SOME OF THE INPUT
INFORMATION IS OBFUSCATED ~231

STORE MODULAR EXPONENTIATION RESULT,
IN DESTINATION STORAGE LOCATION
INDICATED BY INSTRUCTION,
IN RESPONSE TO INSTRUCTION ~232

FIG. 3

METHOD IN PROCESSOR OF PERFORMING
MODULAR EXPONENTIATION INSTRUCTION
WITH MONTGOMERY REDUCTION
335

RECEIVE MODULAR EXPONENTIATION WITH OBFUSCATED INPUT INFORMATION INSTRUCTION INDICATING SOURCE OPERAND(S) STORING OPTIONALLY OBFUSCATED BASE (B), OPTIONALLY OBFUSCATED EXPONENT (E), OPTIONALLY OBFUSCATED MODULUS (N), AND OPTIONALLY ONE OR MORE OPTIONALLY OBFUSCATED REDUCTION CONSTANTS USED IN MONTGOMERY REDUCTION — 336

DEOBFUSCATE ANY OPTIONALLY OBFUSCATED INPUT INFORMATION — 337

CALCULATE REDUCTION CONSTANTS R2 AND U OF MONTGOMERY REDUCTION BASED ON MODULUS (N) IF NOT PROVIDED IN SOURCE OPERAND(S) — 338

PERFORM MODULAR EXPONENTIATION CALCULATIONS WITH MONTGOMERY REDUCTION UTILIZING REDUCTION CONSTANTS — 339

STORE MODULAR EXPONENTIATION RESULT IN DESTINATION STORAGE LOCATION — 340

FIG. 4

MODULAR EXPONENTIATION
WITH UBFUSCATED INPUT
INFORMATION INSTRUCTION
402

| OPCODE | FIRST SOURCE OPERAND INDICATION FIELD | SECOND SOURCE OPERAND INDICATION FIELD | THIRD SOURCE/DEST OPERAND INDICATION FIELD | OPERAND SIZE INDICATION FIELD | ONE OR MORE OPERAND UBFUSCATION INDICATION FIELDS |
|---|---|---|---|---|---|
| 442 | 444 | 446 | 448 | 450 | 452 |

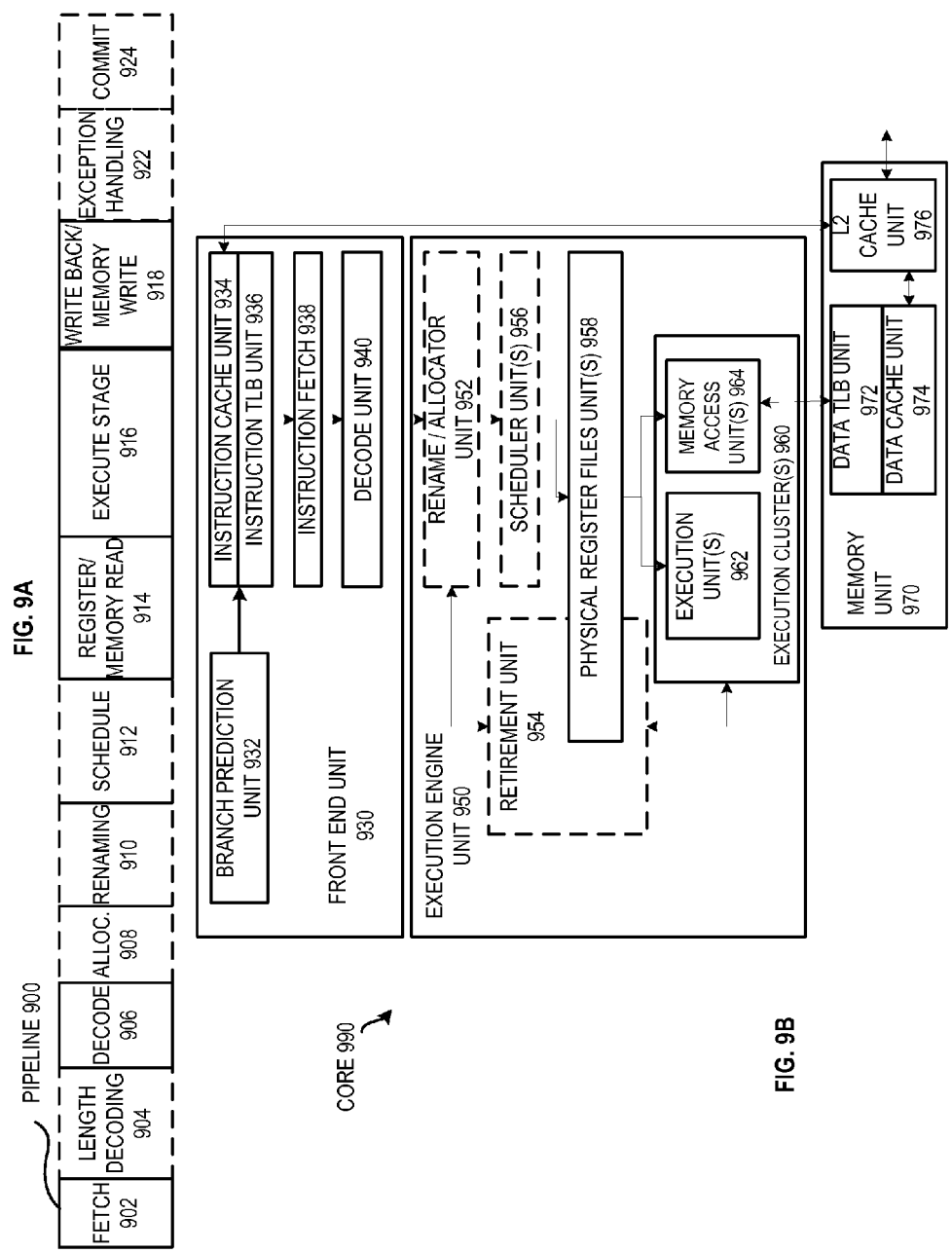

SECURE MODULAR EXPONENTIATION PROCESSORS, METHODS, SYSTEMS, AND INSTRUCTIONS

BACKGROUND

Technical Field

Embodiments described herein generally relate to processors. In particular, embodiments described herein generally relate to performing modular exponentiation in processors.

Background Information

Cryptography is widely used to help protect the confidentiality and integrity of data and/or communications. Two commonly used types of cryptography are symmetric key cryptography and asymmetric or public-key cryptography.

Symmetric key cryptography uses a single type of key. The same key is used both to encrypt data and to decrypt data. Also, the same key is used both to generate a digital signature and to verify the digital signature.

In contrast, public-key cryptography uses two different types of keys. One of the keys is secret or private, whereas the other key is not secret but rather is publically available. The so called public and private keys are used for different complementary purposes. For example, the public key may be used to encrypt data, whereas the private key may be used to decrypt the encrypted data. As another example, the private key may be used to generate a digital signature, whereas the public key may be used to verify the digital signature.

Public-key cryptography is widely used. For example, public-key cryptography is widely used in various Internet standards or protocols, such as, for example, Secure Sockets Layer (SSL), Transport Layer Security (TLS), Internet Protocol Security (IPsec), Secure/Multipurpose Internet Mail Extensions (S/MIME), Pretty Good Privacy (PGP), and GNU Privacy Guard (GPG).

Generally, when such standards or protocols are employed over the Internet and/or other communication channels, an initial phase generally involves establishing the security of the channel, exchanging cryptographic keys, and verifying certificates. Various public key algorithms may be used. One public key algorithm is the Diffie-Hellman key exchange algorithm, which is sometimes referred to as Diffie-Hellman, or simply as D-H. The Diffie-Hellman algorithm is commonly used to securely exchange secret cryptographic keys over a public channel. Another public key algorithm is the Digital Signature Algorithm (DSA) algorithm. DSA is commonly used to provide digital signatures. Yet another public key algorithm is the RSA algorithm (named after its authors Rivest, Shamir, Adleman). RSA is commonly used to securely exchange secret cryptographic keys as well as to provide digital signatures.

BRIEF DESCRIPTION OF THE DRAWINGS

The invention may best be understood by referring to the following description and accompanying drawings that are used to illustrate embodiments. In the drawings:

FIG. 2 is a block flow diagram of an embodiment of a method of performing an embodiment of a modular exponentiation with obfuscated input information instruction.

FIG. 3 is a block flow diagram of a detailed example embodiment of a method of performing an embodiment of a modular exponentiation with obfuscated input information instruction with Montgomery reduction.

FIG. 4 is a block diagram of an example embodiment of a modular exponentiation with obfuscated input information instruction.

FIG. 9A is a block diagram illustrating an embodiment of an in-order pipeline and an embodiment of a register renaming out-of-order issue/execution pipeline.

FIG. 9B is a block diagram of an embodiment of processor core including a front end unit coupled to an execution engine unit and both coupled to a memory unit.

1. DETAILED DESCRIPTION OF EMBODIMENTS

Figure 1:
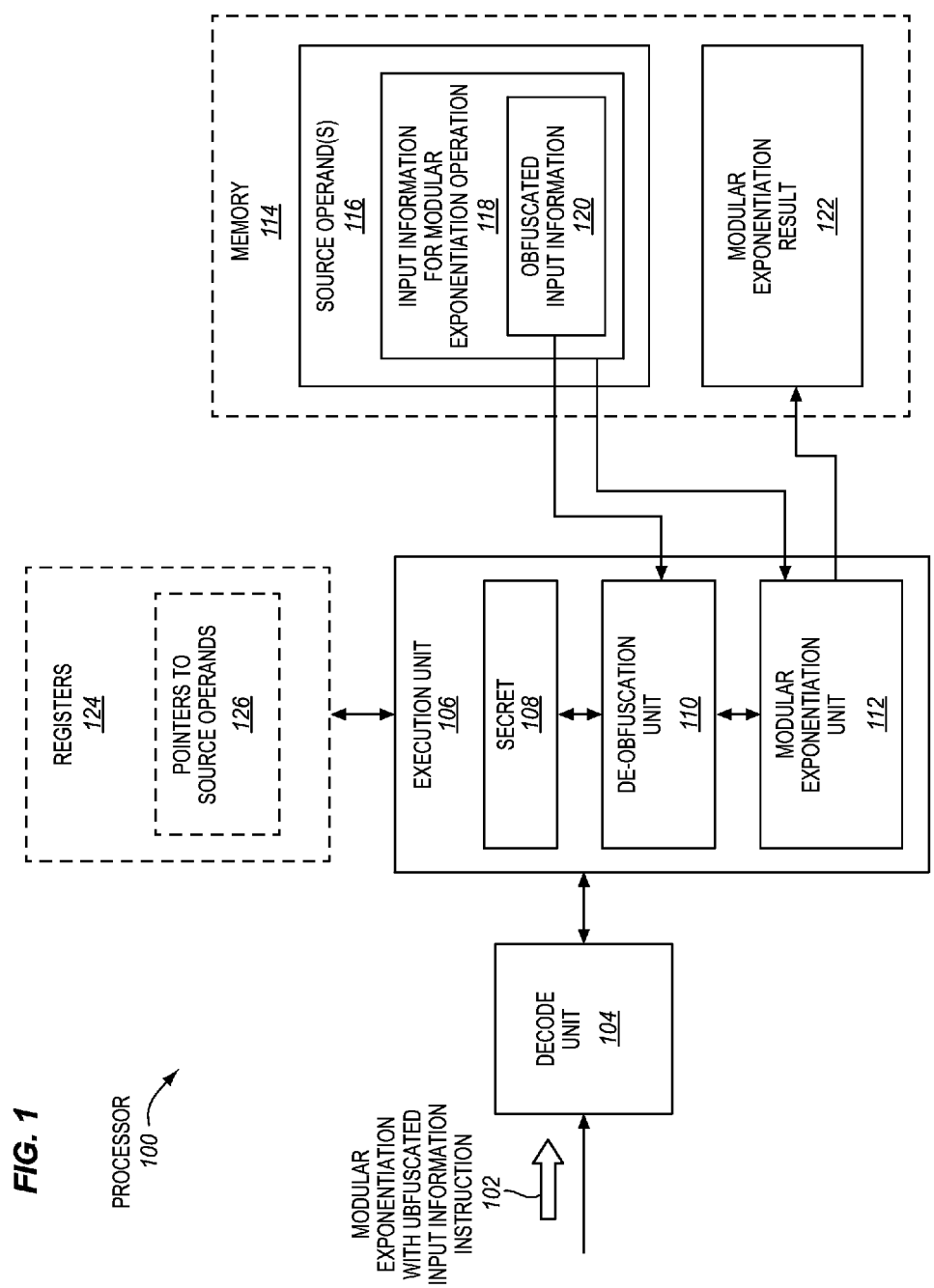
FIG. 1 is a block diagram of an embodiment of a processor that is operative to perform an embodiment of a modular exponentiation with obfuscated input information instruction.

Disclosed herein are modular exponentiation instructions, processors to execute the instructions, methods performed by the processors when processing or executing the instructions, and systems incorporating one or more processors to process or execute the instructions. In some embodiments, the modular exponentiation instructions may be used to perform modular exponentiation in conjunction with various different public-key cryptography algorism, such as, for example, RSA, DSA, and Diffie-Hellman algorithms. In such public-key cryptography algorism modular exponentiation tends to be used heavily when establishing secure sessions over the Internet and/or other communication links (e.g., in conjunction with secure session setup, certificate signing, certificate verification, and the like). In other embodiments, the modular exponentiation instructions disclosed herein may be used to perform modular exponentiation in conjunction with various other computer implemented algorithms and/or communication related algorithms and/or data processing algorithms. The scope of the invention is not limited to any known use of these modular exponentiation instructions, but rather they are general-purpose instructions that may be used for various different purposes by those skilled in the arts.

In the following description, numerous specific details are set forth (e.g., specific instruction operations, specific algorithms for implementing modular exponentiation, specific data formats, specific processor configurations, specific microarchitectural details, specific sequences of operations, etc.). However, embodiments may be practiced without these specific details. In other instances, well-known circuits, structures and techniques have not been shown in detail to avoid obscuring the understanding of the description.

Initially, a brief discussion of modular exponentiation may be helpful. Modular exponentiation may be expressed as shown in Equation 1:

1. $R=B^E \bmod N$          Equation 1

According to this expression, a modular exponentiation result (R) equals the remainder of an exponentiation of a base (B) raised to an exponent (E) modulo a modulus (N). The exponentiation involves taking or raising the base (B) to the power of the exponent (E). By way of example, if the exponent is a positive integer, then the exponentiation may represent multiplying an exponent number of bases together (e.g., B*B*B*B . . . for an exponent number of times). Then, the result of the exponentiation may be divided by the modulus (N) to determine a remainder R.

Commonly, in many applications, one or more of the base, exponent, and/or modulus may represent relatively large integers (e.g., commonly larger than about 256-bits, and often much larger). For example, in many implementations of RSA, DSA, and Diffie-Hellman, it is not uncommon for each of the base, exponent, and modulus to be large integers each of at least 512-bits, each of at least 1024-bits, or even larger. In addition, the size of the integers used may potentially increase over time in order to help provide additional security. Accordingly, performing such modular exponentiation calculations generally tends to be computationally intensive and time consuming. In one aspect, the modular exponentiation instructions disclosed herein may tend to help accelerate the modular exponentiation calculations, which may help to improve performance.

In addition, in some embodiments, the modular exponentiation instructions may be modular exponentiation with obfuscated input information instructions and/or may have obfuscated input information. These instructions may help to improve the confidentiality or security of modular exponentiation calculations. Commonly, and especially when used in public-key cryptographic applications, the modular exponentiation calculations may be based on secret, private, or confidential information. As one illustrative example, in the case of RSA being used for the sign process which is commonly done on Internet servers, the exponent (E) is a secret or private value that should not be revealed. In other applications, different and/or additional information may potentially be secret or private, such as, for example, any combination of the base (B), the exponent (E), the modulus (N), parameters calculated from the modulus (e.g., reduction constants), or other information.

However, one challenge is that conventional software implementations of modular exponentiation do not sufficiently protect such secret or private information. For example, such secret or private information is generally readable or otherwise accessible to at least some software. However, all software, including even the most highly privileged system-level software (e.g., a virtual machine monitor (VMM), operating system (OS), basic input/output system (BIOS), or the like, may potentially be corrupted (e.g., in the case of privileged malware) and therefore may not be fully trustworthy. If the software is corrupted and is able to read the secret or private information, then the intended security associated with the public-key cryptographic algorithms may be at least partially compromised. In some cases, this can be a tremendous problem. As one example, in some cases the secret key may be extremely valuable (e.g., more valuable than the data being protected in a single session). As another example, in the OpenSSL Heartbleed vulnerability, due to a bug in OpenSSL, any private key of a supposedly trusted web-server could have potentially been stolen due to a memory buffer overflow. This could allow the web-server to be sufficiently impersonated so that clients may not know whether or not they are communicating with the real web-server or an imposter web-server. If there is no trail or evidence of the private key being stolen, then to be really secure, potentially a very large number of servers would have to revoke and generate new certificates, which generally tends to be extremely challenging.

Advantageously, the obfuscated information of the modular exponentiation with obfuscated input information instructions disclosed herein may help to significantly enhance the protection of secret or confidential information (e.g., the information input to the modular exponentiation calculations). In some embodiments, the obfuscated information may not be accessible, or at least not readable, by even the most highly privileged system-level software (e.g., a VMM, an OS, a BIOS, etc.). Various different suitable ways of obfuscating the information will be discussed further below. This may be used to help increase the security of various public-key cryptography algorithms, as well as various other uses.

FIG. 1 is a block diagram of an embodiment of a processor 100 that is operative to perform an embodiment of a modular exponentiation with obfuscated input information instruction 102. In some embodiments, the processor may be a general-purpose processor (e.g., a general-purpose microprocessor or central processing unit (CPU) of the type used in desktop, laptop, or other computers). Alternatively, the processor may be a special-purpose processor. Examples of suitable special-purpose processors include, but are not limited to, cryptographic processors, communications processors, network processors, co-processors, embedded processors, digital signal processors (DSPs), and controllers (e.g., microcontrollers). The processor may have any of various complex instruction set computing (CISC) architectures, reduced instruction set computing (RISC) architectures, very long instruction word (VLIW) architectures, hybrid architectures, other types of architectures, or have a combination of different architectures (e.g., different cores may have different architectures).

During operation, the processor may receive the modular exponentiation with obfuscated input information instruction 102. For example, the instruction may be pre-fetched, fetched, or otherwise received from memory over a bus or other interconnect. The instruction may represent a macro-instruction, assembly language instruction, machine code instruction, or other instruction or control signal of an instruction set of the processor.

The processor includes a decode unit or decoder 104. The decode unit may receive and decode the modular exponentiation with obfuscated input information instruction 102. The decode unit may output relatively lower-level instructions or control signals (e.g., microinstructions, micro-operations, micro-code entry points, decoded instructions or control signals, etc.), which reflect, represent, and/or are derived from the relatively higher-level modular exponentiation with obfuscated input information instruction. In some embodiments, the decode unit may include one or more input structures (e.g., port(s), interconnect(s), an interface) to receive the instruction, an instruction recognition and decode logic coupled therewith to recognize and decode the instruction, and one or more output structures (e.g., port(s), interconnect(s), an interface) coupled therewith to output the lower-level instructions or control signals. The decode unit may be implemented using various different mechanisms including, but not limited to, microcode read only memories (ROMs), look-up tables, hardware implementations, programmable logic arrays (PLAs), and other mechanisms suitable to implement decode units.

In some embodiments, instead of the modular exponentiation with obfuscated input information instruction being provided directly to the decode unit, an instruction emulator, translator, morpher, interpreter, or other instruction conversion module may optionally be used. Various types of instruction conversion modules may be implemented in software, hardware, firmware, or a combination thereof. In some embodiments, the instruction conversion module may be located outside the processor, such as, for example, on a separate die and/or in a memory (e.g., as a static, dynamic, or runtime emulation module). By way of example, the instruction conversion module may receive the modular exponentiation with obfuscated input information instruction, which may be of a first instruction set, and may emulate, translate, morph, interpret, or otherwise convert the modular exponentiation with obfuscated input information instruction into one or more corresponding intermediate instructions or control signals, which may be of a second different instruction set. The one or more intermediate instructions or control signals of the second instruction set may be provided to a decode unit (e.g., decode unit 104), which may decode them into one or more lower-level instructions or control signals executable by native hardware of the processor (e.g., one or more execution units).

In some embodiments, the modular exponentiation with obfuscated input information instruction 102 may explicitly specify (e.g., through one or more fields or a set of bits), or otherwise indicate (e.g., implicitly indicate), storage locations for a plurality of source operands 116. The source operands may be used to store input information 118 for a modular exponentiation operation or calculation associated with the instruction. In some embodiments, the instruction may also explicitly specify or otherwise indicate a destination storage location where a modular exponentiation result 122 is to be stored responsive to and/or as a result of the instruction. As one example, the instruction may have source and/or destination operand fields to specify or otherwise indicate storage locations for these operands. Alternatively, the storage locations for one or more of these operands may optionally be implicit to the instruction (e.g., implicit to an opcode of the instruction), rather than being explicitly specified.

As shown, the processor 100 during deployment and/or use may be operative to be coupled with, or otherwise in communication with, a memory 114. It is to be noted that embodiments of the invention pertain to a processor alone, which is capable or operative to be coupled with and to interact with the memory, but is not yet coupled with the memory. As shown, in some embodiments, the source operands 116, and the destination storage location where the modular exponentiation result is to be stored, may optionally be locations in the memory. By way of example, in some embodiments, the instruction may optionally specify or otherwise indicate registers, in a set of registers 124 of the processor, which may store addresses or other pointers to the locations in the memory for these operands. Alternatively, one or more packed data registers, locations in a dedicated stream buffer of the processor, or other storage locations may optionally be used for one or more of these source and/or destination operands. Moreover, although shown as being separate in the illustration for ease of illustration, in some embodiments, the same storage location used for a source operand (e.g., for a base) may optionally be reused as the destination storage location to store the modular exponentiation result. For example, the instruction may explicitly specify an address to indicate a location in memory where a source operand is to be stored, and it may be implicit or inherent to the processor (e.g., based on an opcode of the instruction) that the same location in memory is to be used for the destination storage location.

The registers 124, may represent on-die storage locations that are operative to store data. In one aspect, the registers 124 may optionally be 32-bit or 64-bit general-purpose registers. The registers may represent architecturally-visible or architectural registers that are visible to software and/or a programmer and/or are the registers indicated by instructions of the instruction set of the processor to identify operands. These architectural registers are contrasted to other non-architectural registers in a given microarchitecture (e.g., temporary registers, reorder buffers, retirement registers, etc.). The registers may be implemented in different ways in different microarchitectures and are not limited to any particular type of design. Examples of suitable types of registers include, but are not limited to, dedicated physical registers, dynamically allocated physical registers using register renaming, and combinations thereof.

Referring again to FIG. 1, various different types of input information 118, including the obfuscated input information 120, are suitable for different embodiments. In some embodiments, the input information may include a base, an exponent, a modulus, one or more parameters pre-calculated from the modulus (e.g., one or more reduction constant), or various combinations thereof. As will be discussed further below, various reduction algorithms for modular exponentiation (e.g., Montgomery reduction, Barrett reduction, etc.) define reduction constants, which are often derived from the modulus and/or potentially other input parameters, to help simplify the implementation of modular exponentiation. In general, any combination of input information sufficient to allow the modular exponentiation calculations to be performed may optionally be used in different embodiments.

In addition, any of such input information 118, including potentially none of it or potentially all of it or any intermediate level, may optionally be provided as the obfuscated input information 120 to help provide any additional amount of security desired for the particular implementation. As one example, if a secret key to be derived based on the modular exponentiation calculations is intended to be used to protect information that is not considered sufficiently secret and/or deserving of the additional protections provided by the obfuscation (e.g., as determined for the particular implementation by the programmer), then none of the input information may optionally be obfuscated. Instead, potentially some enhanced performance may be achieved by omitting an operation to decrypt or otherwise de-obfuscated such obfuscated information. As another example, if a secret key to be derived based on the modular exponentiation calculations is intended to be used to protect information that is considered sufficiently secret and/or deserving of the additional protections provided by the obfuscation (e.g., as determined for the particular implementation by the programmer), then anywhere from at least some to all of the input information (e.g., an architecturally programmable or configurable portion) may optionally be obfuscated. For example, in one embodiment, the obfuscated input information may optionally include an obfuscated base, an obfuscated exponent, and an obfuscated modulus, or any combination thereof.

In some embodiments, the instruction may flexibly specify or indicate whether or not one or more portions of the input information is obfuscated. For example, one programmable or configurable set of one or more bits of the instruction may indicate if the exponent is obfuscated, another programmable or configurable set of one or more bits of the instruction may indicate if the base is obfuscated, and yet another programmable or configurable set of one or more bits of the instruction may indicate if the modulus is obfuscated. In other embodiments, the instruction may implicitly indicate (e.g., it may be fixed for an opcode) whether or not one or more portions of the input information is obfuscated. For example, it may be implicit to a first opcode of a first instruction that only a first portion (e.g., an exponent) is obfuscated, it may be implicit to a second different opcode of a second different instruction that only a second different portion (e.g., a modulus) is obfuscated, and it may be implicit to a third still different opcode of a third still different instruction that multiple portions (e.g., all of the base, exponent, and modulus) are obfuscated. Combinations of such approaches may also be used. For example, it may be implicit to an opcode that a first portion (e.g., an exponent) is obfuscated and a set of one or more bits of the instruction may indicate whether a second portion (e.g., a modulus) is obfuscated. Various different combinations of these approaches are contemplated.

A wide variety of different types of obfuscated input information 120 are suitable for different embodiments. The obfuscated input information is not the actual input information itself that is input into the modular exponentiation calculations. For example, an obfuscated exponent (E*) is not the actual exponent (E) that is input into the modular exponentiation calculations. Rather, the obfuscated exponent (E*) may represent an obfuscated value that may be de-obfuscated to determine the actual exponent (E) that is input into the modular exponentiation calculations. In various embodiments, the obfuscated input information may include any of a wide variety of different types of encrypted, convoluted, modified, or otherwise obfuscated input information from which the actual input information cannot be determined with except with one of difficulty, extreme difficulty, computational impracticality, or infeasibility, according to the particular level of enhanced security desired for the particular implementation, unless a secret (e.g., secret 108) is known. The secret (e.g., secret 108) may be known to the processor but not accessible or at least not readable by software (e.g., even the most highly privileged system-level software).

Referring again to FIG. 1, an execution unit 106 is coupled with the decode unit 104 and in some embodiments with the registers 124 (e.g., if the pointers to the source operands are stored in the registers). When deployed in a system, in some embodiments, the execution unit may be operative to be coupled with the memory 114 (e.g., to receive the source operands if they are stored therein). The execution unit may receive the one or more decoded or otherwise converted instructions or control signals that represent and/or are derived from the modular exponentiation with obfuscated input information instruction 102. The execution unit may also receive the input information 118 for the modular exponentiation operation, including any optional obfuscated input information 120. In some embodiments, there is optionally at least some obfuscated input information, although the scope of the invention is not so limited.

As shown, the execution unit may include a secret 108, a de-obfuscation unit 110 coupled with the secret, and a modular exponentiation unit 112 coupled with the de-obfuscation unit. As previously descried, the secret may be available to the execution unit and/or the processor, but not accessible to, or at least not readable by, software (e.g., even the most privileged-level system software). In some embodiments, the de-obfuscation unit and/or the execution unit and/or the processor may be operative in response to and/or as a result of the modular exponentiation with obfuscated input information instruction (e.g., in response to instructions or control signals decoded from the instruction) to use the secret to de-obfuscate the obfuscated input information 120. The de-obfuscation and/or the generation of the actual input information may be performed entirely within the confines of the processor such that the actual input information may never be readable by software. In some embodiments, the de-obfuscation unit may optionally be operative, responsive to the instruction, to signal a fault if a de-obfuscation operation does not succeed. For example, in some embodiments, the obfuscated input information may include authentication or integrity check information that may be used to determine whether the de-obfuscation operation provides authenticatable input information and/or input information with integrity. In one aspect, such a failed de-obfuscation may cause a fault to be signaled and/or may cause further performance of the instruction to be stopped (e.g., prevent a modular exponentiation result from being generated and stored).

The secret and the de-obfuscation are to be interpreted broadly herein as being based on any of a wide variety of different types of information, logic, or a combination of information and logic, from which the actual input information may be determined from the obfuscated input information, but without which the actual input information cannot except with at least difficult or extreme difficulty be determined from the obfuscated input information. In some embodiments, the obfuscated input information may represent encrypted input information and the secret may represent a secret cryptographic key that may be stored and/or generated on-die that may be used to decrypt the encrypted input information to determine the actual input information. In other embodiments, the secret may represent information that may be combined in a particular way (e.g., according to a cryptographic or mathematical algorithm) with the obfuscated input information to determine the actual input information.

In other embodiments, the secret may represent information and/or logic that may be used to modify or transform the obfuscated input information in a particular way (e.g., according to a cryptographic, mathematical, or logical transformation) to determine the actual input information. In further embodiments, the secret may represent the actual input information itself stored as a secret on the processor, which may be selected and used if the obfuscated input information has a particular required value or passes a test or criteria. In still other embodiments, the secret may represent information and/or logic operative to modify the obfuscated input information in a secret way to determine the actual input information. In some embodiments, the secret may include information that earlier software stored into the processor by that later software is not able to read and/or logic that earlier software configured in the processor but that later software is not able to read or reconfigure, although the scope of the invention is not so limited. Alternatively, the secret may represent other types of secret on-die information and/or secret on-die logic that may be used to de-obfuscate the obfuscated input information. Various combinations of these approaches are also generally suitable. It is to be appreciated that these are just a few illustrative examples. Other approaches discussed elsewhere herein are also suitable. Moreover, still other approaches will be apparent to those skilled in the art and having the benefit of the present disclosure.

The modular exponentiation unit 112 may be operative to generate a modular exponentiation result 122 from the complete set of input information (e.g., including any de-obfuscated input information). In some embodiments, the modular exponentiation result may be generated within the execution unit and within the confines of the performance of the same single modular exponentiation with obfuscated input information instruction. One potential advantage is that this may help to avoid exposing cryptographically processed portions or intermediate results, which could potentially be analyzed to reveal the information that is supposed to be secret (e.g., any of the various types of obfuscated input information previously described). Rather, in some embodiments, all such intermediate results may be held within the modular exponentiation unit and/or the execution unit 106 and/or the processor, instead of being stored in architecturally visible registers or memory locations. Once the modular exponentiation result has been generated, the execution unit may be operative in response to and/or as a result of the instruction to store the modular exponentiation result in the destination storage location (e.g., a location in memory) indicated by the instruction. Often, in the case of many public-key cryptography uses, the modular exponentiation result may be stored in an unencrypted and non-obfuscated format, since it generally will be processed by regular software.

Advantageously, by providing obfuscated input information to the processor, instead of the actual input information, software (e.g., even privileged malware) may not be able to read the actual input information directly and may not with at least difficulty or in some embodiments extreme difficulty (e.g., according to the particular level of enhanced security desired for the particular implementation) be able to determine the actual input information. When used in conjunction with public-key cryptography, for example, this may help to protect secret or private information (e.g., private keys) and/or otherwise help to increase security.

The execution unit and/or the processor may include specific or particular logic (e.g., transistors, integrated circuitry, or other hardware potentially combined with firmware (e.g., instructions stored in non-volatile memory)) that is operative to perform the modular exponentiation with obfuscated input information instruction and/or store the modular exponentiation result in response to and/or as a result of the instruction (e.g., in response to instructions or control signals decoded therefrom). By way of example, the execution unit may include a microcode engine, state machine, or the like, to perform the operations of the modular exponentiation. In some embodiments, the execution unit may include one or more input structures (e.g., port(s), interconnect(s), an interface) to receive the input information and/or obfuscated input information, circuitry or logic coupled therewith to receive and process the received information and generate the modular exponentiation result, and one or more output structures (e.g., port(s), interconnect(s), an interface) coupled therewith to output the modular exponentiation result.

To avoid obscuring the description, a relatively simple processor has been shown and described. However, the processor may optionally include other processor components. For example, various different embodiments may include various different combinations and configurations of the components shown and described for any of FIGS. 9-11. All of the components of the processor may be coupled together to allow them to operate as intended.

FIG. 2 is a block flow diagram of an embodiment of a method 230 of performing an embodiment of a modular exponentiation with obfuscated input information instruction. In various embodiments, the method may be performed by a processor, instruction processing apparatus, or other digital logic device. In some embodiments, the method 230 may be performed by and/or within the processor 100 of FIG. 1. The components, features, and specific optional details described herein for the processor 100, also optionally apply to the method 230. Alternatively, the method 230 may be performed by and/or within a different processor or apparatus. Moreover, the processor 100 may perform different methods than the method 230.

The method includes receiving the modular exponentiation with obfuscated input information instruction, at block 231. In various aspects, the instruction may be received at a processor or a portion thereof (e.g., an instruction fetch unit, a decode unit, a bus interface unit, etc.). In various aspects, the instruction may be received from an off-processor and/or off-die source (e.g., from memory, interconnect, etc.), or from an on-processor and/or on-die source (e.g., from an instruction cache, instruction queue, etc.).

The modular exponentiation with obfuscated input information instruction may specify or otherwise indicate a plurality of source operands (e.g., at a plurality of locations in memory) that store input information for a modular exponentiation operation. In some embodiments, the input information may include a base, an exponent, a modulus, one or more parameters pre-calculated from the modulus (e.g., one or more reduction constant), or various combinations thereof sufficient to provide all needed input for the given approach. In some embodiments, at least some of the input information (e.g., any of the aforementioned input information) may optionally be obfuscated, although this is not required. The obfuscated input information may be the same as or similar to that described elsewhere herein.

A modular exponentiation result may be stored in response to and/or as a result of the modular exponentiation with obfuscated input information, at block 232. The modular exponentiation result may be stored in a destination storage location that is specified or otherwise indicated by the modular exponentiation with obfuscated input information instruction.

The illustrated method involves architectural operations (e.g., those visible from a software perspective). In other embodiments, the method may optionally include one or more microarchitectural operations. By way of example, the instruction may be fetched, decoded, scheduled out-of-order, source operands may be accessed, an execution unit may perform microarchitectural operations to implement the instruction, etc. In some embodiments, the microarchitectural operations to implement the instruction may optionally include any of those shown and described for any of FIG. 3 or 6-8, including the variations mentioned therefor. One example operation that may optionally be performed is to de-obfuscate the obfuscated input information. This may optionally include operations of any of the de-obfuscation approaches discussed elsewhere herein.

Commonly, completely performing the modular exponentiation may take a relatively large number of cycles (e.g., from thousands to tens of thousands or even more depending upon the operand sizes). Completely performing the modular exponentiation with obfuscated input information instruction may take even more cycles due to the computations needed to de-obfuscate the operands.

Due in part to the relatively large number of cycles, it is possible that at times the performance of the instruction may be interrupted prior to completion. In some embodiments, one of several possible precautions may optionally be taken to help to ensure that partial or intermediate state, which could potentially be analyzed to determine secret information, does not become readable by software.

In some embodiments, the execution unit, in response to an interruption while performing the instruction, may be operative to stop performing the modular exponentiation calculations and/or the instruction, encrypt a current intermediate state calculated at or around the time of the interruption, and store the encrypted intermediate state in a storage location (e.g., a location in memory). By way of example, the intermediate state may be encrypted with a secret key of the processor that is not readable by software. After the interruption has been resolved, the encrypted intermediate state may be retrieved, decrypted, and the algorithm may resume starting with the recovered intermediate state. In other embodiments, the execution unit, in response to an interruption while performing the instruction, may be operative to stop performing the modular exponentiation calculations and/or the instruction, and store a current intermediate state calculated at or around the time of the interruption in an on-die storage of the processor (e.g., a non-architecturally visible storage) that is not readable by software. In other embodiments, the execution unit, in response to an interruption while performing the instruction, may be operative to stop performing the modular exponentiation calculations and/or the instruction, and discard a current intermediate state calculated at or around the time of the interruption. Any of these approaches may optionally be used in the processor 100 of FIG. 1 and/or the method 230 of FIG. 2.

To further illustrate certain concepts, it may be helpful to consider a few possible implementation algorithms for modular exponentiation. One possible algorithm for implementing modular exponentiation, without any special so-called reduction methods, is shown in the following pseudocode:

---

$E = (e_{1023}\ e_{1022}\ e_{1021}\ ...\ e_2\ e_1\ e_0)_2$
Initialize $A = 1$
For i from 1023 to 0
$A = A^2$ modulo N
If $e_i = 1$
$A = A*B$ modulo N
Return A

---

As shown, the exponent may be represented by its individual bits ($e_i$), where $e_i$ ranges from $e_0$ through $e_{1023}$. Initially, a value A may be set equal to one. Then, the value A may be updated during each of 1024 iterations of a loop. Specifically, within each of the 1024 iterations, the value A may be updated to be equal to its square taken modulo N (i.e., $A=A^2$ modulo N). For each of the 1024 iterations, when the corresponding exponent bit for the loop (i.e., ei) is set to binary one (i.e., when $e_i=1$), the value A is further updated to be equal to the product of itself and the base (B) taken modulo N (i.e., A=A*B modulo N). Otherwise, when the corresponding exponent bit for the loop (i.e., $e_i$) is cleared to binary zero (i.e., when $e_i=0$), this is not done. At the end of the loop, the value of A is returned as the result of the modular exponentiation.

This algorithm for implementing modular exponentiation may optionally be used if desired. However, often the implementation of this algorithm may tend to be slow. For one thing, the modulo operation(s) performed within the iterations of the loop generally tend to be slow to implement. Representatively, these operations may be implemented with division-like operations, which generally take a relatively long time to compute, at least as compared to other types of operations like multiplications. In addition, such modulo operation(s) need to be performed within each iteration of the loop, of which there may be many (e.g., 1024 in this example, or in some cases even more). Accordingly, although this algorithm is suitable for implementing the modular exponentiation according to some embodiments, often it may be desirable to use a modular exponentiation algorithm that uses special modular reduction schemes in order to achieve faster performance.

FIG. 3 is a block flow diagram of an example embodiment of a detailed method 335 of performing an embodiment of a modular exponentiation with obfuscated input information instruction with Montgomery reduction. In various embodiments, the method may be performed by a processor, instruction processing apparatus, or other digital logic device. In some embodiments, the method 335 may be performed by and/or within the processor 100 of FIG. 1. The components, features, and specific optional details described herein for the processor 100, also optionally apply to the method 335. Alternatively, the method 335 may be performed by and/or within a different processor or apparatus. Moreover, the processor 100 may perform different methods than the method 335.

The method includes receiving the modular exponentiation with obfuscated input information instruction, at block 336. The instruction may specify or otherwise indicate one or more source operands storing an optionally obfuscated base (B), an optionally obfuscated exponent (E), an optionally obfuscated modulus (N), optionally one or more optionally obfuscated reduction constants used in the Montgomery reduction, or any combination thereof representing at least sufficient input to the Montgomery reduction algorithm. Embodiments contemplate obfuscating any combination of such input information ranging from none of it to all of it.

Then, at block 337, any optional obfuscated input information, if there is any for the particular embodiment, may be de-obfuscated. The de-obfuscation may be performed using any of the approaches and/or in any of the ways described elsewhere herein.

Then, at block 338, any of the needed reduction constants of the Montgomery reduction, if they were not already provided as pre-calculated reduction constants in the input information provided by the source operand(s), may be calculated. Alternatively, one or more of the reduction constants may optionally be provided as pre-calculated constants in the input information provided by the source operand(s). This may help to avoid needing to calculate these reduction constants within the confines of the execution of the instruction. In some embodiments that use 1024-bit operands, the method may use two reduction constants (R2 and U) defined by the Montgomery reduction as functions of the modulus (N) as shown in Equations 2 and 3:

$$R2 = 2^{2048} \text{ modulo } N \qquad \text{Equation 2}$$

$$U = -N^{-1} \text{ modulo}(2^{64}) \qquad \text{Equation 3}$$

Next, at block 339, modular exponentiation calculations may be performed with Montgomery reduction using the reduction constants R2 and U. By way of example, this may be performed as shown the following pseudo-code:

```
E = (e₁₀₂₃ e₁₀₂₂ e₁₀₂₁ ... e₂ e₁ e₀)₂
B' = B*R2  // Montgomery-multiplication == B*R mod N
Initialize A = B'
Identify index of most significant set bit in E as X
For i ranging from X-1 to 0
    A = A²     // Montgomery square
    If ei = 1
        A = A*B'   // Montgomery-multiplication
Return Montgomery-Reduce(A)
```

In the above pseudocode:
(1) Montgomery-multiplication of numbers X and Y may represent $(X*Y*R^{-1})$ mod N;
(2) Montgomery-square of a number X may represent $(X*X*R^{-1})$ mod N;
(3) Montgomery-Reduce of a number X may represent $(X*R^{-1})$ mod N.

The exponent may again be represented by its individual bits ($e_i$), where $e_i$ ranges from $e_0$ through $e_{1023}$ in this particular example of a 1024-bit exponent. Initially, a Montgomery-multiplication may be performed to calculate a B' value by multiplying the base by the R2 constant (i.e., B'=Montgomery-multiplication(B,R2)). Then, a value A may be set equal to B'. Next, an optional aspect is implemented in which the index (X) of the most significant set bit in the exponent (E) is identified, and then the loop is optionally performed only for values of the counter (i) ranging from (X-1) to zero. In other words, instead of performing the maximum number of iterations of the loop (e.g., 1024 iterations), iterations corresponding to cleared bits more significant than the most significant set bit in the exponent (E) may optionally be omitted. This may help to improve performance in some cases, but is optional not required. Instead, the maximum number of iterations of the loop (e.g., 1024 iterations) may optionally be performed if desired.

Then, the value A may be updated during each of iterations of the loop. Specifically, within each of the iterations, the value A may be updated to be equal to its Montgomery-square. Note that, as opposed to the non-Montgomery implementation described above, there is no need to perform division-like operations and thereby improve performance. For each of the iterations, when the corresponding exponent bit for the loop (i.e., $e_i$) is set to binary one (i.e., when $e_i$=1), the value A is further updated to be equal to the Montgomery-multiplication of itself and the B' value. Otherwise, when the corresponding exponent bit for the loop (i.e., ei) is cleared to binary zero (i.e., when $e_i$=0), this is not done. Note again that, as opposed to the non-Montgomery implementation described above, there is no need to perform division-like operations and thereby improve performance. At the end of the loop, a Montgomery reduction is performed on the final value A. This represents the modular exponentiation result.

Referring again to FIG. 3, at block 340, the modular exponentiation result, as calculated by the Montgomery reduction, may be stored in the destination storage location indicated by the instruction. Any of the destination storage locations described elsewhere herein are suitable.

The aforementioned method represents just one illustrative example embodiment of a method of performing a modular exponentiation with obfuscated input information instruction with Montgomery reduction. Other methods are also contemplated and will be apparent to those skilled in the art and having the benefit of the present disclosure. For example, the illustrated method was based on a 1024-bit base, exponent, and modulus, although in other embodiments the base, exponent, and modulus may have various other power-of-two sizes, ranging over several orders of magnitude (e.g., may range from 256-bits to on the order of 16,384 bits). As another example, the illustrated method was based on a word-level Montgomery reduction algorithm that uses a word size of 64-bits, although in other embodiments a 32-bit or other word size may optionally be used. In addition, the method has been described in a relatively basic form, but operations may optionally be added to and/or removed from the method. In addition, the particular order of operations is not required, but rather certain operations may optionally be performed in other orders and/or overlapped.

One specific example embodiment of a suitable modular exponentiation with obfuscated input information, named MODEXP_LOCKED1, is illustrated in the pseudocode below.

```
MODEXP_LOCKED1 {
// input information
Src1 R1  // register storing pointer to memory location having obfuscated modulus
Src2 R2  // register storing pointer to memory location having obfuscated exponent
SrcDst R3  // register storing pointer to memory location having obfuscated base
// de-obfuscate base, modulus, and exponent
N = de-obfuscate (Src1)     // optionally signal fault if de-obfuscation fails
E = de-obfuscate (Src2)     // optionally signal fault if de-obfuscation fails
B = de-obfuscate (SrcDst)   // optionally signal fault if de-obfuscation fails
// calculate Montgomery reduction constants
R2 = 2²⁰⁴⁸ mod N
U = -N⁻¹ mod (2⁶⁴)
// perform modular exponentiation
B' = B*R2    // Montgomery-multiply == B*R mod N
Initialize A = B'
Determine index of most significant set bit in E as X
For i from X-1 to 0
    A = A²    // Montgomery-square
    If eᵢ = 1
```

-continued

```
A = A*B' // Montgomery-Multiply
*SrcDst = Montgomery-Reduce(A)
}
```

The U constant is used within the Montgomery-reduction operation as follows (which may also be used in other Montgomery-reduction operations herein):

```
Montgomery-reduction(X, N, U){
    A = X
    For (i=0...(1024/64-1)) {   // A is broken up into its 64-bit chunks a_i
        u_i = a_i*U mod 2^64
        A = A + u_i*N*2^{64*i}
    }
    A = A / 2^{1024}
    If (A >= N) A = A - N
    Return A // == (X* R^{-1}) mod N.
}
```

The MODEXP_LOCKED1 instruction may explicitly specify or implicitly indicate a first register (R1), for example a first 64-bit general-purpose register, that is to store an effective address, pointer, or other indication of a location in memory that is to store a first source operand (Src1) having an obfuscated modulus. The instruction may also explicitly specify or implicitly indicate a second register (R1), for example a second 64-bit general-purpose register, that is to store an effective address, pointer, or other indication of a location in memory that is to store a second source operand (Src2) having an obfuscated exponent. The instruction may also explicitly specify or implicitly indicate a third register (R3), for example a third 64-bit general-purpose register, that is to store an effective address, pointer, or other indication of a location in memory that is to store a source-destination operand (SrcDst) initially having an obfuscated base, and upon completion of the instruction serving as a destination storage location where a modular exponentiation result is to be stored. Alternatively, any of the various other ways of indicating the source and/or destination operands disclosed elsewhere herein may optionally be used instead.

In this embodiment, all of the base, exponent, and modulus are obfuscated. Alternatively, in other embodiments, any one or more including any combination of the base, exponent, and modulus may optionally be obfuscated. The instruction may control or otherwise cause an execution unit to de-obfuscate the obfuscated base, exponent, and modulus. Any of the de-obfuscation approaches mentioned elsewhere herein are suitable (e.g., one of the approaches described below for FIGS. 6-8). As one illustrative example, the execution unit may decrypt encrypted input information using a secret processor cryptographic key. A fault may optionally be signaled if any of the de-obfuscations fails.

In this embodiment, since the Montgomery reduction constants weren't provided as input through the source operands, the instruction may control or otherwise cause the execution unit to calculate the Montgomery reduction constants. Specifically, the R2 and U constants may be calculated within the performance of the instruction. Representatively, these constants may be pre-calculated once per modular exponentiation operation/instruction. Then, the instruction may control or otherwise cause the execution unit to perform the Montgomery reduction of modular exponentiation calculations utilizing the reduction constants. Finally, the execution unit, responsive to the instruction, may store a modular exponentiation result in the destination storage location (e.g., in this case SrcDst).

Another specific example embodiment of a suitable modular exponentiation with obfuscated input information, named MODEXP_LOCKED2, is illustrated in the pseudo-code below.

```
MODEXP_LOCKED2 {
    // input information
    Src1 R1 // register storing pointer to memory location having obfuscated N||R2||U
    Src2 R2 // register storing pointer to memory location having obfuscated exponent
    SrcDst R3 // register storing pointer to memory location having obfuscated base
    // de-obfuscate base, modulus, and exponent
    N||R2||U = de-obfuscate (Src1)   // optionally signal fault if de-obfuscation fails
    E = de-obfuscate (Src2)   // optionally signal fault if de-obfuscation fails
    B = de-obfuscate (SrcDst)   // optionally signal fault if de-obfuscation fails
    // no need to calculate Montgomery reduction constants since precomputed
    // perform modular exponentiation
    B' = B*R2 // Montgomery-multiply == B*R mod N
    Initialize A = B'
    Determine index of most significant set bit in E as X
    For i from X-1 to 0
        A = A^2    // Montgomery-square
        If e_i = 1
            A = A*B' // Montgomery-Multiply
    *SrcDst = Montgomery-Reduce(A)
}
```

The MODEXP_LOCKED2 instruction is similar to the MODEXP_LOCKED1 instruction. The discussion and variations mentioned above for the MODEXP_LOCKED1 instruction also optionally apply to the MODEXP_LOCKED2 instruction. One difference however, is that the MODEXP_LOCKED2 instruction provides the R2 and U reduction constants as input through the source operands (e.g., as pre-calculated constants). In the illustrated embodiment, the reduction constants are optionally concatenated (e.g., as shown by symbol ||) or otherwise provided along with the modulus, although this is not required. The reduction constants are derivable from the modulus so there is some benefit to keeping them in the same source operand.

However, in other embodiments, the reduction constants may be provided by other source operands and/or multiple source operands. Since the reduction constants are provided as input, there is no need for the execution unit to calculate these reduction constants as part of the operation of the instruction. Rather, the reduction constants may be de-obfuscated, if they are obfuscated, as for the other input parameters. In some embodiments, if the modulus is obfuscated, then the reduction constants may also be obfuscated, whereas if the modulus is not obfuscated, then the reduction constants may not be obfuscated.

Another example of a suitable reduction algorithm for modular exponentiation is Barrett reduction. Other embodiments pertain to a method similar to that shown in FIG. 3, except where a Barrett reduction constant is used, and a Barrett reduction algorithm is used to perform the modular exponentiation. In some embodiments, the method may use a reduction constant defined by the Barrett reduction as functions of the modulus (N) as shown in Equation 4:

1. $U = \text{floor}(2^{2048}/N)$   Equation 4

The Barrett reduction may use the reduction constant as shown the following pseudo-code:

```
// perform modular exponentiation where
E = (e_1023 e_1022 e_1021 ... e_2 e_1 e_0)_2
    Initialize A = B
    Identify index of most significant set bit in E as X
    For i ranging from X-1 to 0
        A = A^2    // Barrett square-reduce
        If e_i = 1
            A = A*B // Barrett-multiplication reduce
    Return (A)
```

The reduction itself for a 1024-bit modulus may be performed as follows:

```
Barrett-reduction(X, N, U){
    Q1 = floor(X/2^1023)
    Q2 = Q1*U
    Q3 = floor(Q2/2^1025)
    R1 = X mod 2^1025
    R2 = Q3*N mod 2^1025
    R = R1 - R2
    If (R <0) R = R + 2^1025
    while (R >= N) R = R - N
    Return R    // == X mod N.
}
```

The Barrett-multiplication of 2 numbers X and Y may be performed as Barrett-reduction (X*Y, N, U). This may also be performed similarly for the square operation. Note this is somewhat similar to a Montgomery-multiply of two numbers, which may be done as a regular multiplication of the two numbers followed by a Montgomery-reduce.

The Barrett reduction has certain similarities to the Montgomery reduction previously described. To avoid obscuring the description, the different or additional features will be described primarily without repeating all of the similar features and optional variations. However, it is to be appreciated that the features and optional variations described for Montgomery reduction also optionally apply to Barrett reduction, unless stated otherwise, or unless otherwise clearly apparent (e.g., unless they are incompatible with Barrett reduction).

Yet another specific example embodiment of a suitable modular exponentiation with obfuscated input information, named MODEXP_LOCKED3, is the same as that shown above for MODEXP_LOCKED1 except that the Barrett reduction constants and calculations are used instead of the Montgomery reduction constants and calculations. A still further specific example embodiment of a suitable modular exponentiation with obfuscated input information, named MODEXP_LOCKED4, is the same as that shown above for MODEXP_LOCKED2 except that the Barrett reduction constants and calculations are used instead of the Montgomery reduction constants and calculations.

FIG. 4 is a block diagram of an example embodiment of a modular exponentiation with obfuscated input information instruction 402. The instruction includes an operation code or opcode 442. The opcode may represent a plurality of bits, or one or more fields, that are operative to identify the instruction and/or the operation to be performed (e.g., a modular exponentiation with obfuscated input information operation).

The instruction also includes a first source indication field 444, a second source indication field 446, and a third source/destination indication field 448. These source indication fields may be used to specify or otherwise indicate source storage locations for source operands used to provide input parameters and/or optionally obfuscated input parameters. By way of example, each of these fields may include bits to specify an address of a register, memory location, or other storage location for the associated operand. In other embodiments, fewer or more source and/or destination indication fields may be used. For example, input information may optionally be provided in a single larger memory location. As another example, one or more of these storage locations may optionally be implicit or inherent to the instruction (e.g., the opcode), rather than being specified. Further, if desired an additional separate destination indication field may optionally be used instead of having the third field be a source/destination indication field.

In some embodiments, the instruction may also optionally have an operand size indication field 450. The operand size indication field may allow a size of the source operands to be specified or indicated. This may help to provide flexible or variable, and architecturally programmable or configurable, sized operands to be used. In some embodiments, a single size field may be used to specify or otherwise indicate a single size for all of the source operands, although the scope of the invention is not so limited. In some embodiments, in order to provide a relatively high level of flexibility, the instruction may allow the operand size to be configured to range from around 256-bits to around 16,000-bits, although the scope of the invention is not limited to any known size. Alternatively, fixed size operands may optionally be used, if desired, and the operand size indication field may optionally be omitted. By way of example, a fixed sufficiently large operand size may optionally be used to accommodate the sizes of operands expected to be used for the particular implementation and any unused bits not occupied by smaller operands may optionally be filled with zeros.

In some embodiments, the instruction may also optionally have one or more operand obfuscation indication fields 452. Each of the one or more operand obfuscation indication fields may be used to indicate whether a corresponding operand is optionally obfuscated or not. By way of example, in some embodiments, there may be a first operand obfuscation indication field or set of one or more bits to indicate whether or not a first operand (e.g., to be used to store a base) is obfuscated, there may be a second operand obfuscation indication field or set of one or more bits to indicate whether or not a second operand (e.g., to be used to store a exponent) is obfuscated, and there may be a third operand obfuscation indication field or set of one or more bits to indicate whether or not a third operand (e.g., to be used to store a modulus) is obfuscated. Alternatively, the opcode of the instruction may optionally fix which operands (e.g., which of a base, exponent, and modulus) are obfuscated. For example, different opcode instructions may optionally be provided for different combinations of the base, exponent, and modulus being obfuscated, all of them being modulated, and none of them being modulated, to name a few examples. Advantageously, this may help to allow a programmer to configure or specify which operands are obfuscated so that operands desired to be secure can be secured, whereas other operands not desired to be secured need not be de-obfuscated. As one example, in some algorithms, such as DSA and Diffie-Hellman, some operands are public such as the modulus (e.g., NIST published primes). In Diffie-Hellman phase-1, the base is also published or public, whereas in phase-2 it needs to be secret or private. In some cases, better performance may be achieved by not obfuscating and needing to de-obfuscate the information that is public.

This is just one illustrative example of a suitable instruction. Alternate embodiments may include a subset of the illustrated fields and/or may add additional fields. The illustrated arrangement of the fields is not required, rather the fields may be rearranged variously. Moreover, each of the fields may either consist of a contiguous set of bits, or may include non-contiguous or separated bits that logically represent the field.

Figure 5:
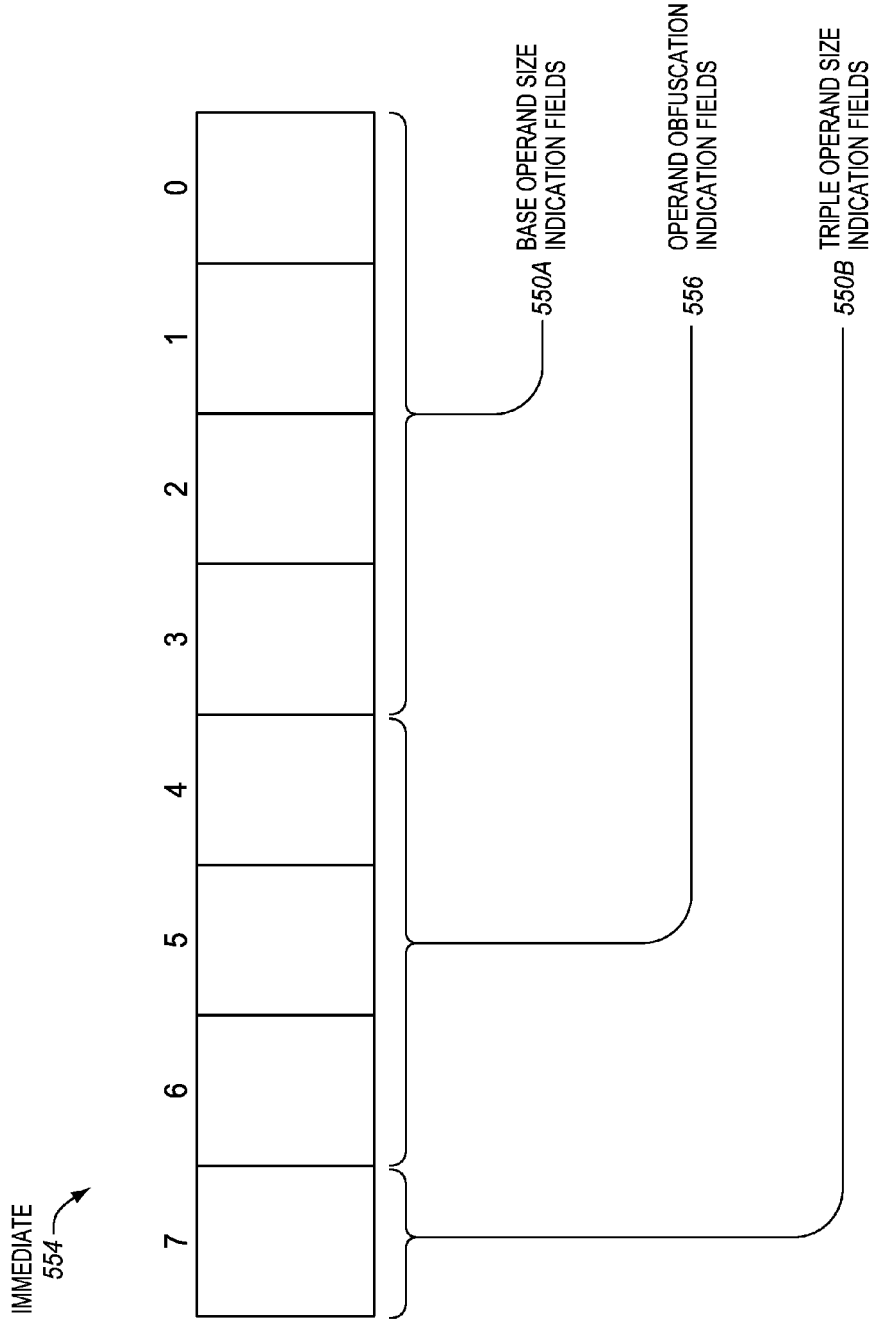
FIG. 5 is a block diagram of an example embodiment of an immediate.

FIG. 5 is a block diagram of an example embodiment of an immediate 554 having an example embodiment of an operand size indication field 550 and an example embodiment of operand obfuscation indication fields 556. In this embodiment, the immediate is an 8-bit immediate, although a larger or smaller immediate may optionally be used.

Bits [3:0] of the immediate represent a base operand size indication field 550A. Alternatively, fewer or more bits may be used to represent the base operand size potentially as an offset from a minimum operand size. Bit [7] of the immediate represents a triple operand size indication field 550B.

may specify a base size for the operands, and the triple operand size indication field may indicate whether or not the base size is to be tripled to determine the size of the operands. By way of example, in one implementation, the bits [3:0] may be shifted left by one bit to determine the base size, and if bit [7] is set to binary one the base size may be tripled. Otherwise, if bit [7] is cleared to binary zero, the base size may be used as the operand size with no size tripling. One potential advantage of the triple operand size indication field is that some uses involve operand sizes that are not only a power of two, but three times a power of two. The triple operand size indication field allows for convenient scaling by such a power of three.

Bits [6:4] of the immediate represent three operand obfuscation indication fields 556. Each of these fields may be used to indicate whether a different corresponding one of three source operands is obfuscated. As one illustrative example, bit [6] may correspond to a source operand to store the modulus, bit [5] may correspond to a source operand to store the exponent, and bit [4] may correspond to a source operand to store the base. Alternatively, these bits may be allocated to the base, exponent, and modulus in different ways. One value (e.g., binary one) of each of bits [6:4] may indicate that the corresponding source operand is obfuscated, whereas another value (e.g., binary zero) may indicate that the corresponding source operand is not obfuscated. One potential advantage of such per-operand obfuscation indication fields, is enhanced flexibility. For example, some uses may have a given one of the exponent, modulus, and base as a secret, whereas other uses may have the same given one as public or private, and the corresponding operand obfuscation indication field may allow a programmer to either obfuscate or not obfuscate the given one to either achieve more security or avoid unnecessary de-obfuscations that make tend to reduce performance.

A further specific example embodiment of a suitable modular exponentiation with obfuscated input information, named MODEXP_LOCKED5, is illustrated in the pseudo-code below.

```
MODEXP_LOCKED5 {
// input information
Src1 R1 // register with pointer to memory location with optionally obfuscated modulus
Src2 R2 // register with pointer to memory location with optionally obfuscated exponent
SrcDst R3 // register with pointer to memory location with optionally obfuscated base
imm8
// de-obfuscate base, modulus, and exponent
N = (imm8[6])? de-obfuscate (Src1): *Src1    // optionally signal fault
E = (imm8[5])? de-obfuscate (Src2): *Src2    // optionally signal fault
B = (imm8[4])? de-obfuscate (SrcDst): *SrcDst    // optionally signal fault
// calculate Montgomery reduction constants
R2 = 2^2048 mod N
U = -N^-1 mod (2^64)
// perform modular exponentiation
B' = B*R2    // Montgomery-multiply == B*R mod N
Initialize A = B'
Determine index of most significant set bit in E as X
For i from X-1 to 0
A = A^2    // Montgomery-square
If e_i = 1
A = A*B' // Montgomery-Multiply
*SrcDst = Montgomery-Reduce(A)
}
```

The base operand size indication field and the triple operand size indication field together or collectively represent an operand size indication field to indicate a size of operands as being any one of a number of different possible sizes. In some embodiments, the base operand size indication field The MODEXP_LOCKED5 instruction is similar to the MODEXP_LOCKED 1. The discussion and variations mentioned above for the MODEXP_LOCKED1 instruction also optionally apply to the MODEXP_LOCKED5 instruction. One difference however, is that the MODEXP_LOCKED5 instruction allows each of the source operands (Src1, Src2, and SrcDst) to be optionally obfuscated (e.g., programmable configuration). Only those obfuscated parameters need to be de-obfuscated.

Yet another specific example embodiment of a suitable modular exponentiation with obfuscated input information, named MODEXP_LOCKED6, is the same as that shown above for MODEXP_LOCKED3 except that it uses the same immediate and obfuscation configurability as the MODEXP_LOCKED5 instruction. A further specific example embodiment of a suitable modular exponentiation with obfuscated input information, named MODEXP_LOCKED7, is the same as that shown above for MODEXP_LOCKED4 except that it uses the same immediate and obfuscation configurability as the MODEXP_LOCKED5 instruction.

Figure 6:
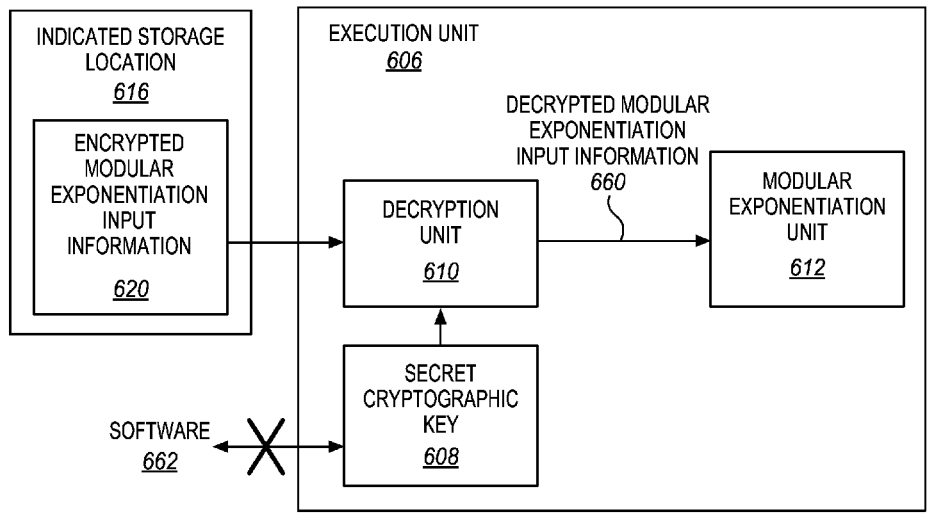
FIG. 6 is a block diagram of a first embodiment of a suitable execution unit.

FIG. 6 is a block diagram of an embodiment of an execution unit 606 that is operative to decrypt actual modular exponentiation input information 660 from encrypted modular exponentiation input information 620 responsive to a modular exponentiation with encrypted input information instruction. The encrypted input information is an example of obfuscated input information. The encrypted input information is stored in a storage location 616 (e.g., a register or memory location) that may be specified or otherwise indicated by the instruction. The execution unit includes a decryption unit 610. The execution unit and/or the decryption unit may be coupled to receive the encrypted input information. The decryption unit and/or the execution unit may also be coupled to receive a secret cryptographic key 608. The secret cryptographic key is accessible and available to the decryption unit and/or the execution unit, but is not accessible to, or at least not readable by, software 662 (e.g., even the most highly privileged system software). In some embodiments, initially the secret cryptographic key may have been written or stored into the processor by software, but subsequently the software 662 may not be able to read it. In the illustrated embodiment, the secret cryptographic key is part of the execution unit. In other embodiments, the secret cryptographic key may instead be separate from the execution unit, but coupled with the execution unit and/or the decryption unit (e.g., stored in a key locker of the processor).

The decryption unit may receive the secret cryptographic key and may be operative to use the secret cryptographic key to decrypt the encrypted input information into the decrypted input information 660. Various different decryption algorithms known in the art are suitable, such as, for example, Advanced Encryption Standard (AES), Data Encryption Standard (DES), triple DES (3DES), Rivest Cipher 4 (RC4), and other block/stream ciphers. A modular exponentiation unit 612 is coupled with the decryption unit, and may receive the decrypted input information. The modular exponentiation unit may use the decrypted input information to compute a modular exponentiation result, as described elsewhere herein. Advantageously, the actual input information 660 used in the modular exponentiation calculations may be generated by the execution unit and/or its processor responsive to the instruction, but this actual input information may never be resident in an architectural register of the processor, or a memory location, or any other architecturally visible storage location, or otherwise readable by the software 662.

Figure 7:
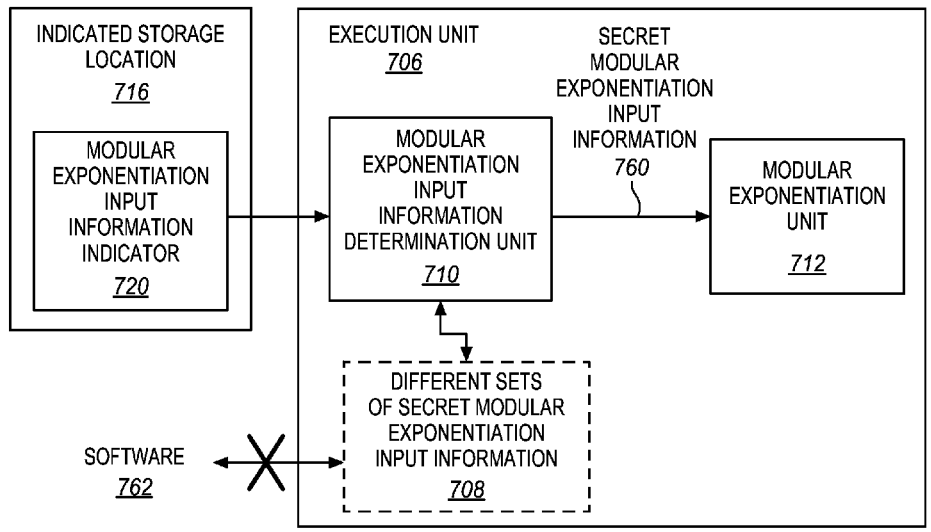
FIG. 7 is a block diagram of a second embodiment of a suitable execution unit.

FIG. 7 is a block diagram of an embodiment of an execution unit 706 that is operative to determine secret modular exponentiation input information 760 from a modular exponentiation input information indicator 720 responsive to a modular exponentiation with obfuscated input information instruction. The input information indicator is an example of obfuscated input information. The indicator may broadly represent any of a wide variety of different types of information or values that may be used to select, identify, or otherwise indicate a set of secret actual input information. The indicator may be stored in a storage location 716 (e.g., a register or memory location) that may be specified or otherwise indicated by the instruction.

The execution unit includes a modular exponentiation input information determination unit 710, which is also referred to herein simply as a determination unit. The execution unit and/or the determination unit may be coupled to receive the input information indicator. The determination unit and/or the execution unit may also be coupled to different sets of secret modular exponentiation input information 708. The different sets of secret modular exponentiation input information represents a secret that is accessible and available to the determination unit and/or the execution unit, but is not accessible or available to software 762 (e.g., even the most highly privileged system software). In the illustrated embodiment, the different sets of secret input information is part of the execution unit. In other embodiments, the different sets of secret input information may instead be separate from the execution unit, but coupled with the execution unit and/or the decryption unit. The determination unit 710 may be operative to use the indicator 720 to determine or obtain a set of secret input information 760 from the different sets of secret input information 708.

The determination unit may use the indicator to determine the secret input information in different ways in different embodiments. In some embodiments, the different sets of secret input information may be ordered in a list, table, array, or other ordered arrangement. The indicator may represent an index, offset, number, or other indicator to select or indicate a particular set of secret input information. For example, an indicator of value eight may select secret input information in the eight entry of an array. In other embodiments, the indicator may be an identifier. The different sets of secret input information may not necessarily be arranged in any particular order. However, each of the different sets of secret input information may have a different corresponding unique identifier. For example, a first set may have an identifier "00000000," a second set may have an identifier "00000010," a third set may have an identifier "01000000," and so on. The identifier may be matched to an identifier of the set of secret input information in order to select or indicate that set of secret input information. These are just a few illustrative examples. Other ways of using an indicator to determine a secret set of input information are contemplated and will be apparent to those skilled in the art and having the benefit of the present disclosure.

A modular exponentiation unit 712 is coupled with the determination unit 710, and may receive the secret input information 760. The modular exponentiation unit may use the secret input information to compute a modular exponentiation result as described elsewhere herein. Advantageously, the secret input information may be generated by the execution unit and/or its processor responsive to the instruction, but may never be readable by the software 762.

Figure 8:
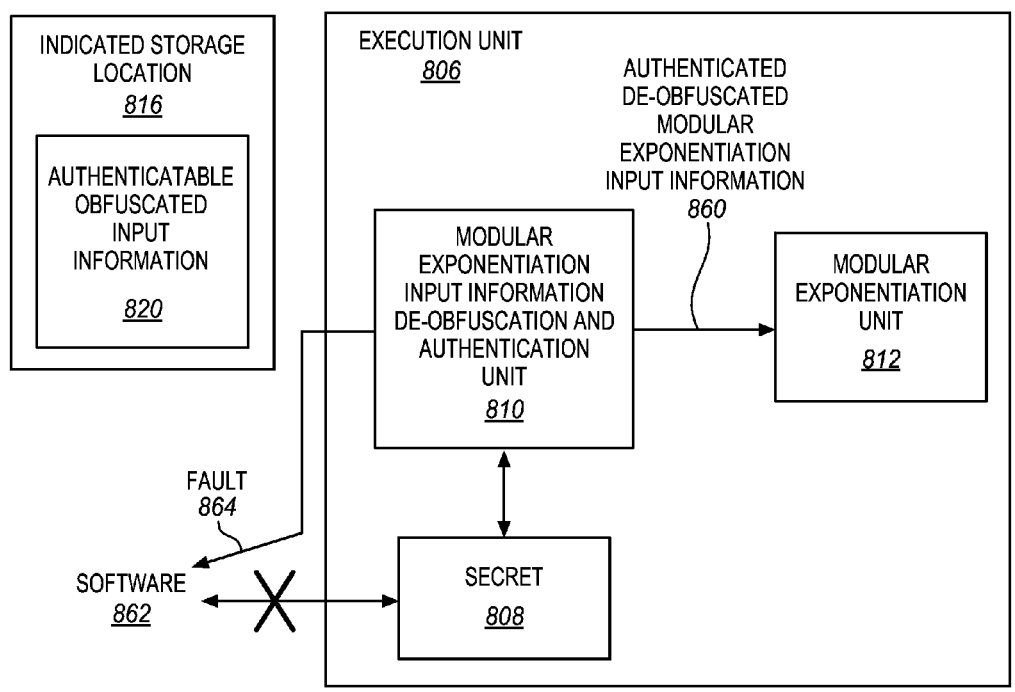
FIG. 8 is a block diagram of a third embodiment of a suitable execution unit.

FIG. 8 is a block diagram of an embodiment of an execution unit 806 that is operative to determine de-obfuscated and authenticated modular exponentiation input information 860 from authenticatable obfuscated input information 820 responsive to a modular exponentiation with obfuscated input information instruction. The authenticatable obfuscated input information is stored in a storage location 816 (e.g., a register or memory location) that may be specified or otherwise indicated by the instruction. The input information is also authenticatable in addition to being obfuscated. In some embodiments, such authentication may be achieved by adding additional bits (e.g., authentication or integrity check bits) to the obfuscated input information.

The execution unit includes a modular exponentiation input information de-obfuscation and authentication unit 810. This unit is also referred to herein simply as the de-obfuscation and authentication unit. The execution unit and/or the de-obfuscation and authentication unit may be coupled to receive the authenticatable obfuscated input information. The de-obfuscation and authentication unit and/or the execution unit may also be coupled to a secret 808 that is not accessible, or at least not readable, by software 862 (e.g., even the most privileged system software). In the illustrated embodiment, the secret is part of the execution unit. In other embodiments, the secret may instead be separate from the execution unit, but coupled with the execution unit and/or the decryption unit.

The de-obfuscation and authentication unit may be operative to use secret and the authenticatable obfuscated input information to obtain the authenticated de-obfuscated input information 860. The de-obfuscation may be performed as described elsewhere herein. In some embodiments, the authenticatable obfuscated input information may include an encrypted and authenticatable input information. By way of example, in some embodiments, a processor in which the execution unit is included may have an encode key instruction in its instruction set. The processor may perform the encode key instruction to generate the authenticatable obfuscated input information which includes the obfuscated input information plus additional authentication or integrity check information. Alternatively, a key wrap algorithm may optionally be used to provide the authenticatable and obfuscated input information. The de-obfuscation and authentication unit may be operative to decrypt and authenticate such information using a secret or hidden cryptographic key.

The authentication may fail if the generated de-obfuscated input information is not what is expected and/or is inconsistent with the authentication information. In some embodiments, in the event of such a failed authentication, then the execution unit may signal a fault 864. For example, the fault may be delivered to the software (e.g., a fault handler of an operating system). In such a case, the processor may stop performing the instruction without storing an output.

A modular exponentiation unit 812 is coupled with the de-obfuscation and authentication unit 810, and may receive the authenticated de-obfuscated input information 860. The modular exponentiation unit may use the authenticated de-obfuscated input information to compute a modular exponentiation result as described elsewhere herein. Advantageously, authentication or integrity check may be used along with obfuscation.

Other embodiments pertain to modular exponentiation instructions that do not indicate obfuscated input information and do not have the capability to obfuscate and de-obfuscate input information. These instructions may be similar to the other modular exponentiation instructions disclosed herein, except that, instead of indicating obfuscated input information, they are only able to indicate non-obfuscated input information. The non-obfuscated input information may be any of that mentioned elsewhere herein (e.g., the base, exponent, and modulus actually used to perform the modular exponentiation). There may be no need to decrypt or otherwise de-obfuscate the input information, since it is not obfuscated and can be used directly in the modular exponentiation calculations. Aside from such obfuscation/de-obfuscation differences, the instructions may otherwise have similar or the same characteristics and variations as the other modular exponentiation instructions disclosed herein. Representatively, such instructions may be used in certain implementations where it may not necessary or sufficiently important to obfuscate the input information. For example, this may be the case where a cryptographic key is short lived (e.g., is only used for one or a few encryptions), where data to be encrypted is not sufficiently important to justify the obfuscation, where the instructions are used for non-cryptographic modular exponentiations, etc. In such cases, there may be less benefit to obfuscating the input information, whereas some increase in performance may generally be obtained by avoiding needing to perform de-obfuscation.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the invention. FIG. 9B is a block diagram illustrating both an exemplary embodiment of an in-order architecture core and an exemplary register renaming, out-of-order issue/execution architecture core to be included in a processor according to embodiments of the invention. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary in-Order Core Architecture

Figure 10B:
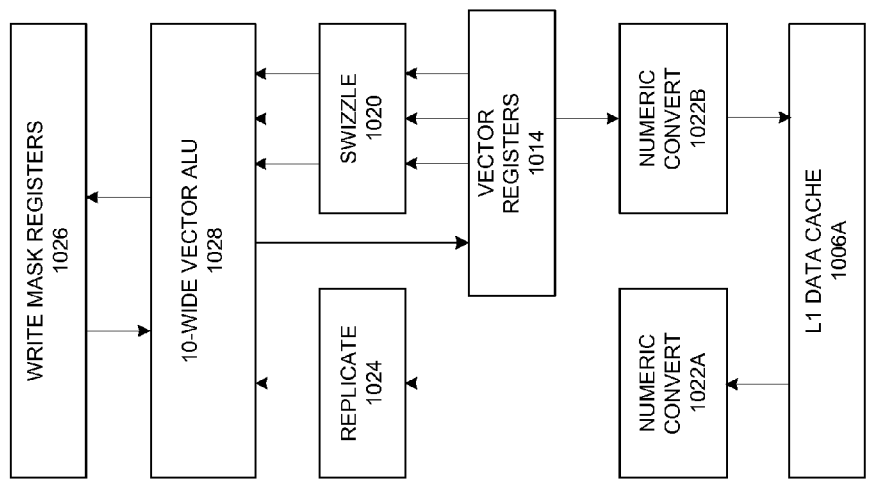
FIG. 10B is a block diagram of an embodiment of an expanded view of part of the processor core of FIG. 10A.
Figure 10A:
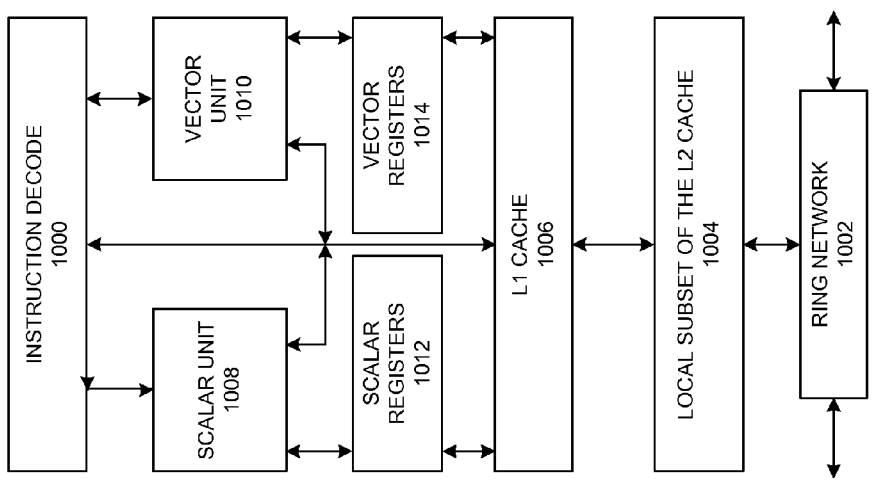
FIG. 10A is a block diagram of an embodiment of a single processor core, along with its connection to the on-die interconnect network, and with its local subset of the Level 2 (L2) cache.

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 11012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the invention. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Processor with Integrated Memory Controller and Graphics

Figure 11:
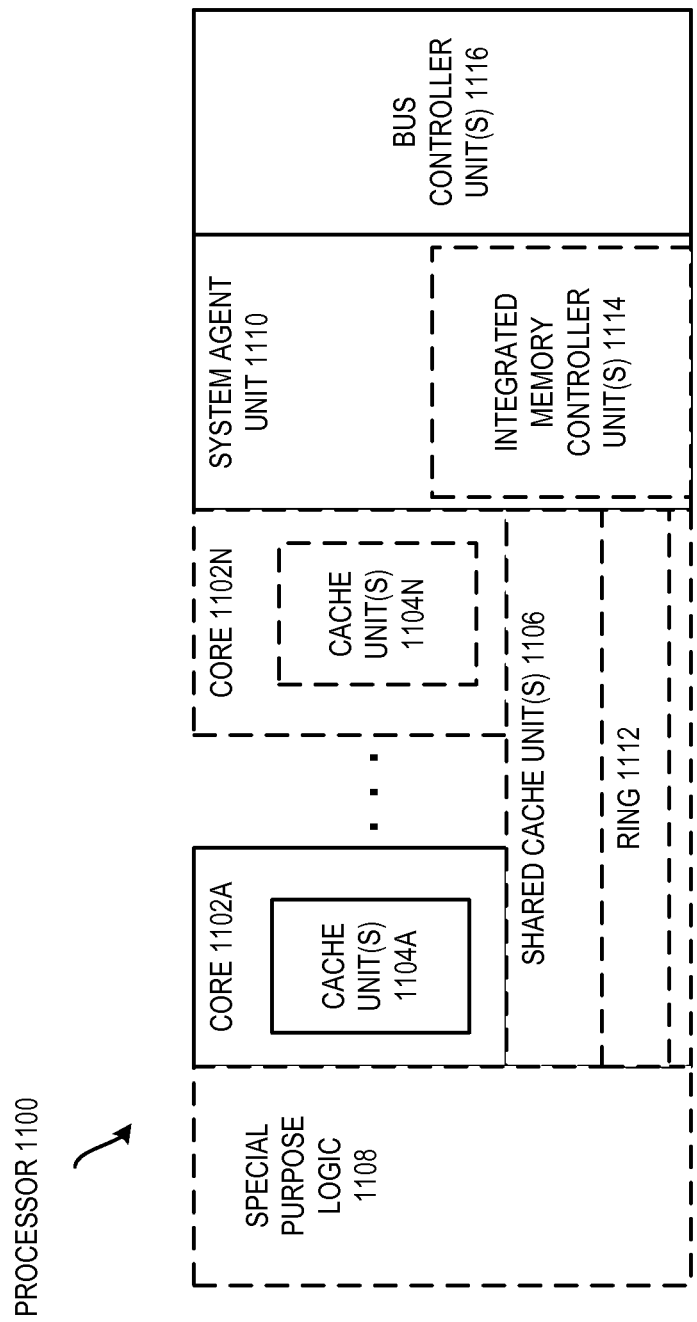
FIG. 11 is a block diagram of an embodiment of a processor that may have more than one core, may have an integrated memory controller, and may have integrated graphics.

FIG. 11 is a block diagram of a processor 1100 that may have more than one core, may have an integrated memory controller, and may have integrated graphics according to embodiments of the invention. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-21 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
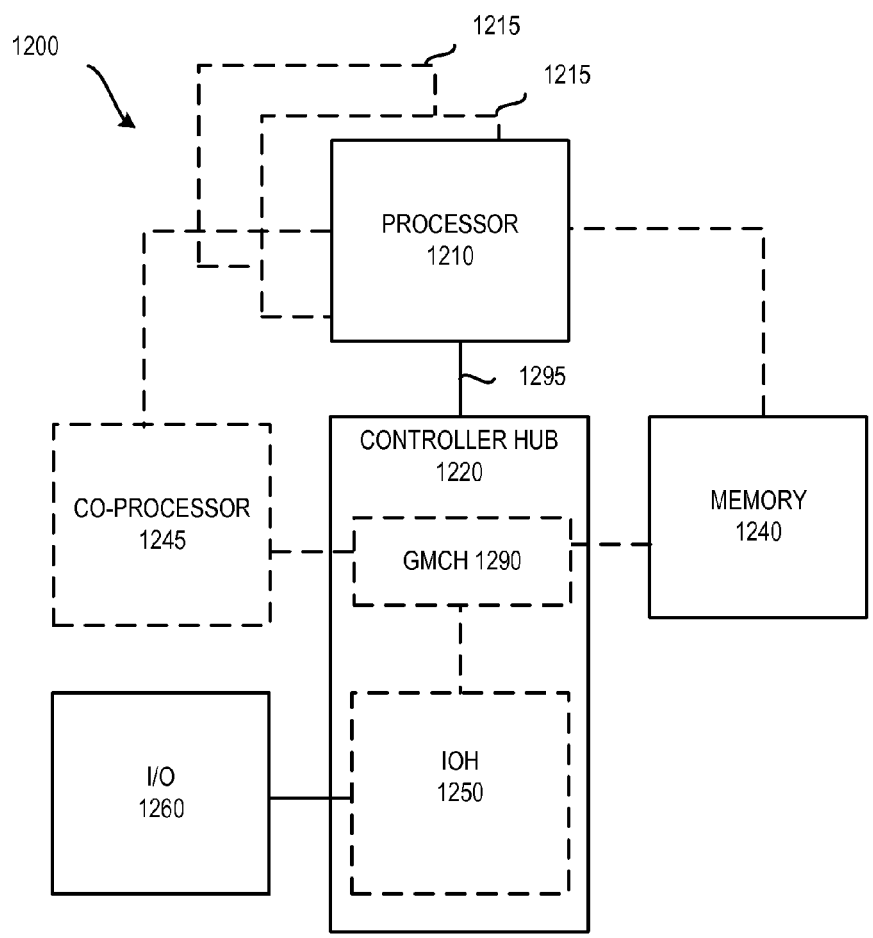
FIG. 12 is a block diagram of a first embodiment of a computer architecture.

Referring now to FIG. 12, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
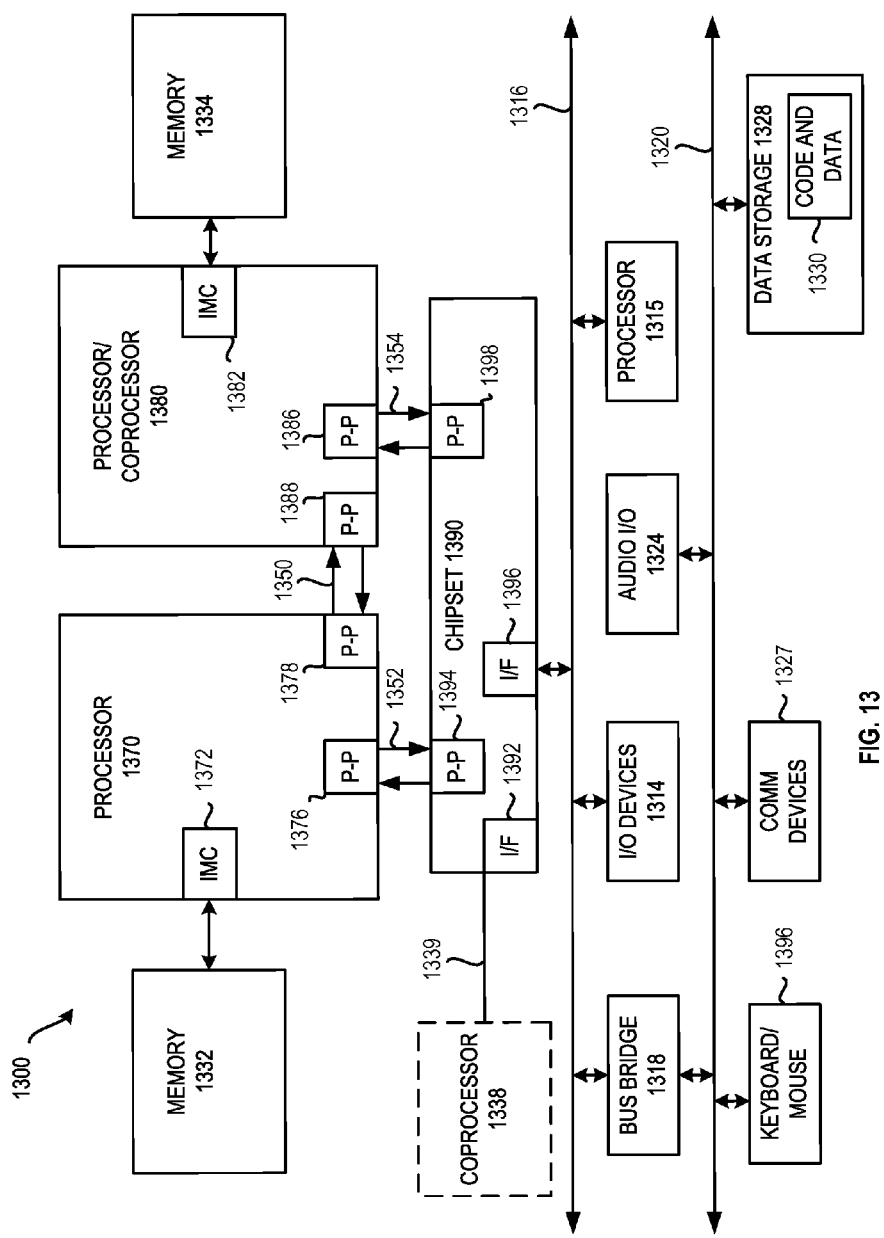
FIG. 13 is a block diagram of a second embodiment of a computer architecture.

Referring now to FIG. 13, shown is a block diagram of a first more specific exemplary system 1300 in accordance with an embodiment of the present invention. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
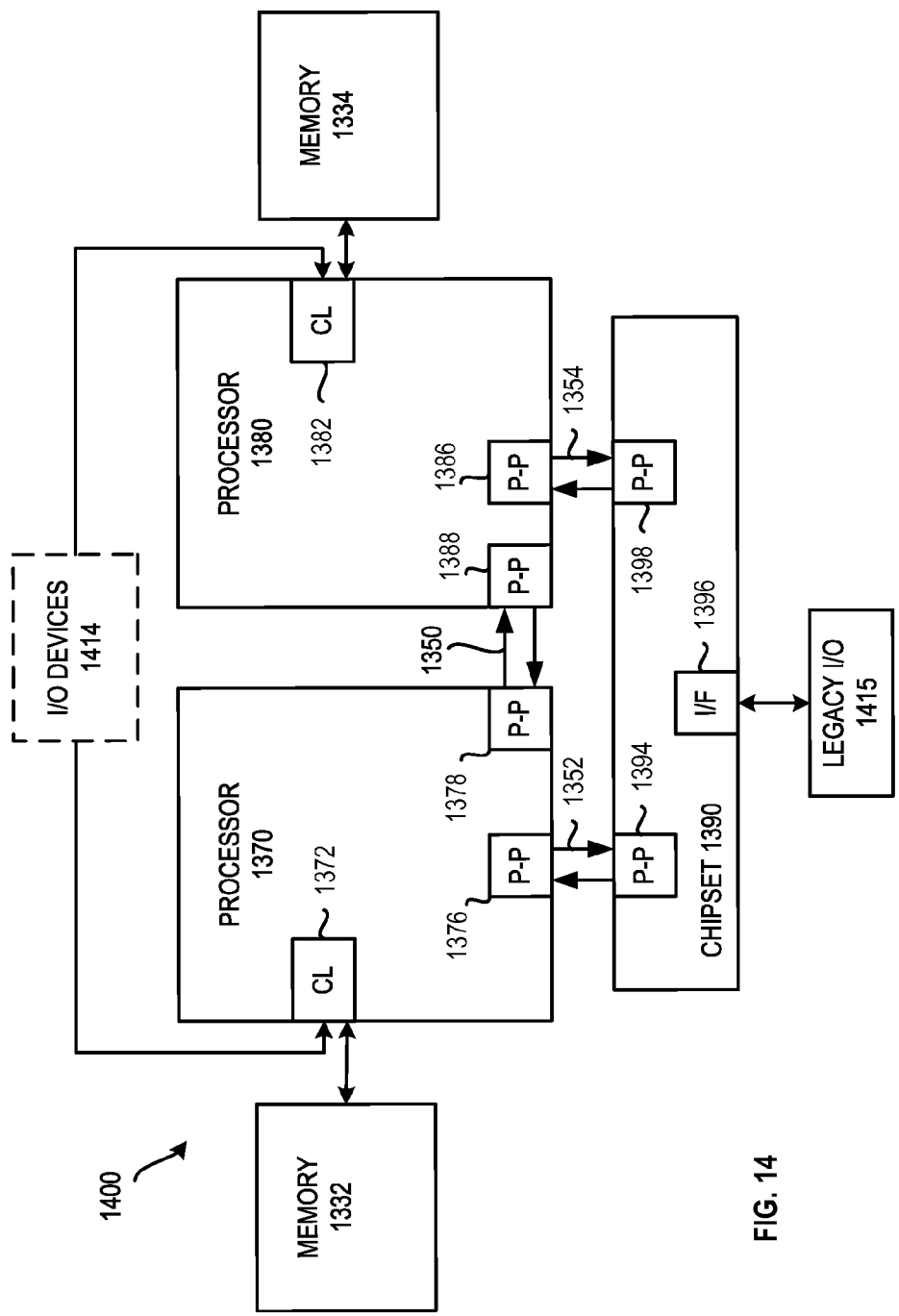
FIG. 14 is a block diagram of a third embodiment of a computer architecture.

Referring now to FIG. 14, shown is a block diagram of a second more specific exemplary system 1400 in accordance with an embodiment of the present invention. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
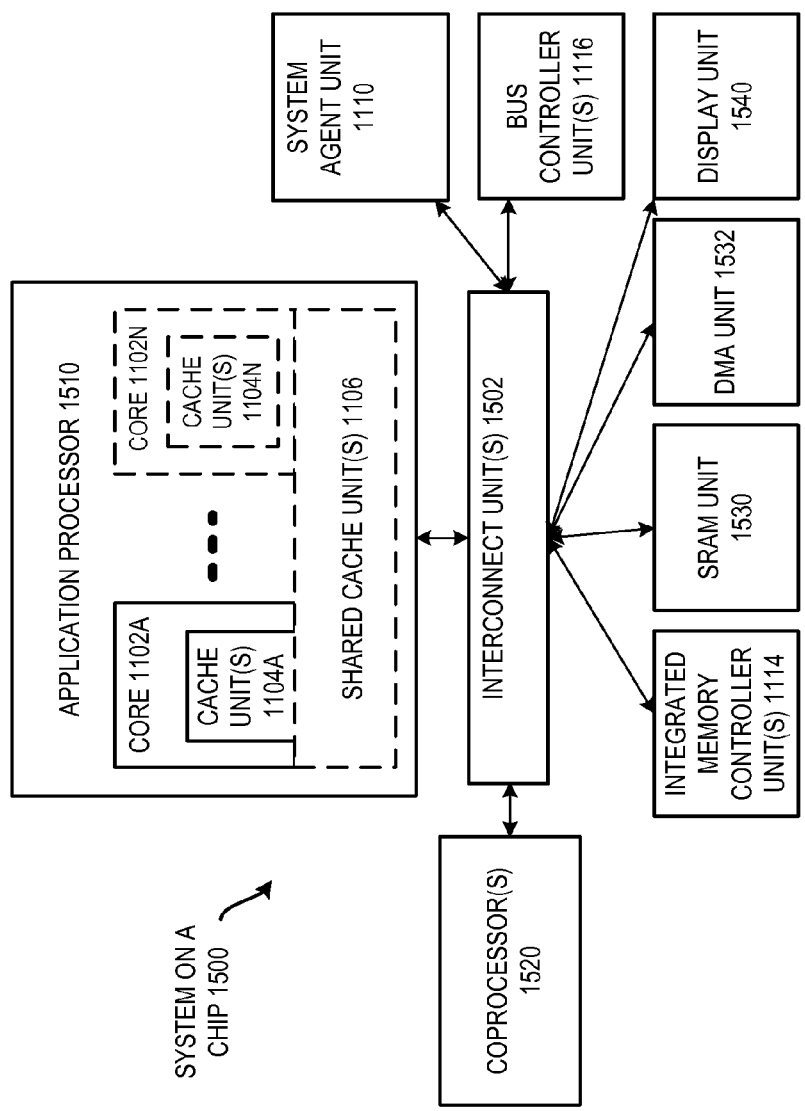
FIG. 15 is a block diagram of a fourth embodiment of a computer architecture.

Referring now to FIG. 15, shown is a block diagram of a SoC 1500 in accordance with an embodiment of the present invention. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 142A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 16:
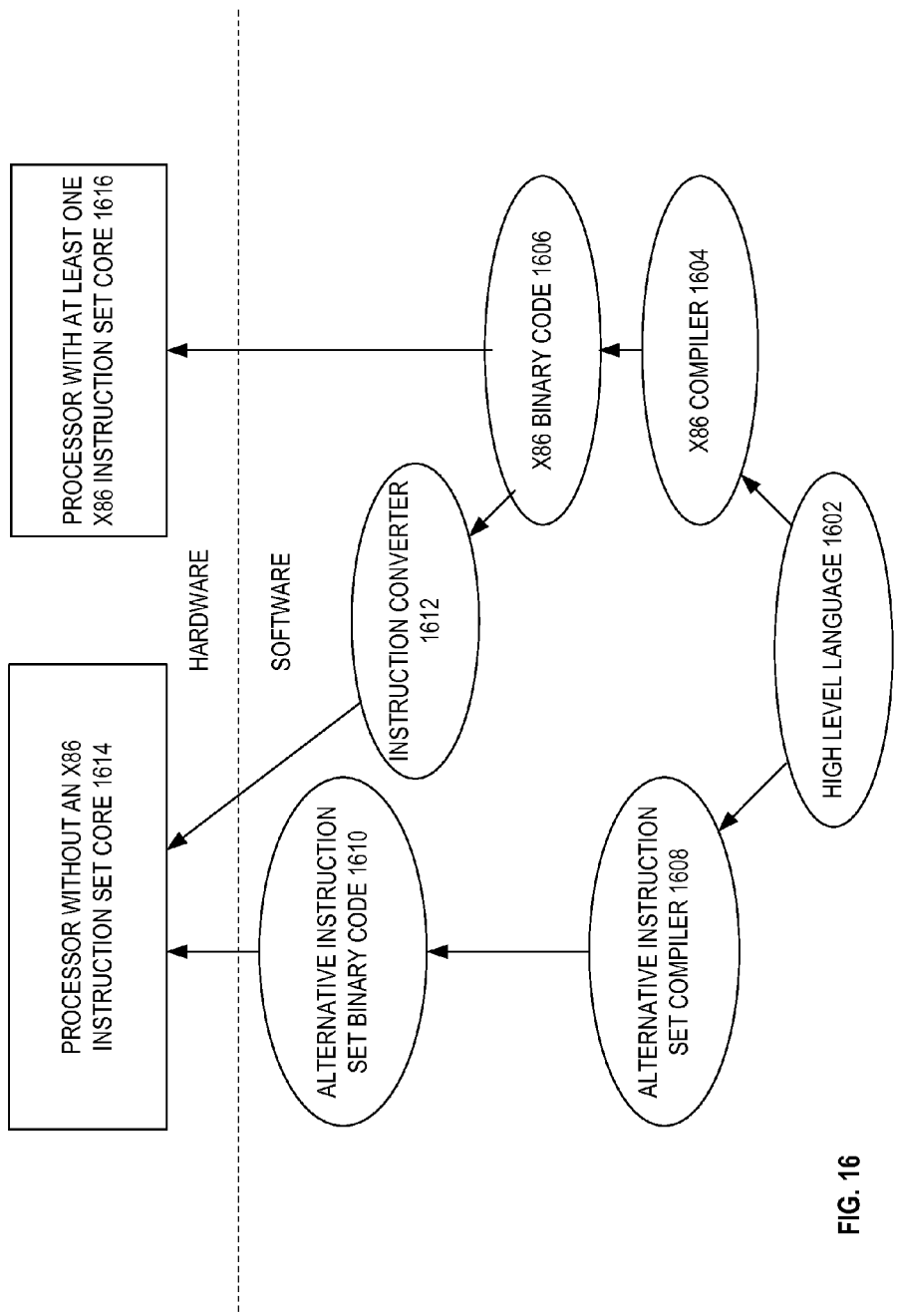
FIG. 16 is a block diagram of use of a software instruction converter to convert binary instructions in a source instruction set to binary instructions in a target instruction set, according to embodiments of the invention.

FIG. 16 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

Components, features, and details described for any of FIGS. 3-8 may also optionally apply to any of FIGS. 1-2. Moreover, components, features, and details described for any of the apparatus may also optionally apply to any of the methods, which in embodiments may be performed by and/or with such apparatus. Any of the processors described herein may be included in any of the computer systems disclosed herein. In some embodiments, the computer system may include a dynamic random access memory (DRAM). Alternatively, the computer system may include a type of volatile memory that does not need to be refreshed or flash memory. The instructions disclosed herein may be performed with any of the processors shown herein, having any of the microarchitectures shown herein, on any of the systems shown herein.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit and/or a memory through one or more intervening components. In the figures, arrows are used to show connections and couplings.

In the description and/or claims, the terms "logic," "unit," "module," or "component," may have been used. In some embodiments, each of these terms may refer to hardware potentially combined with some firmware (e.g., transistors, gates, integrated circuitry, application specific integrated circuits, analog circuits, digital circuits, programmed logic devices, memory devices including instructions, etc.).

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operative to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operative to cause the machine to perform and/or result in the machine performing one or operations, methods, or techniques disclosed herein.

In some embodiments, the machine-readable medium may include a non-transitory machine-readable storage medium. For example, the non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like. The non-transitory machine-readable storage medium does not consist of a transitory propagated signal. In some embodiments, the storage medium may include a tangible medium that includes solid matter.

Examples of suitable machines include, but are not limited to, a general-purpose processor, a special-purpose processor, a digital logic circuit, an integrated circuit, or the like. Still other examples of suitable machines include a computer system or other electronic device that includes a processor, a digital logic circuit, or an integrated circuit. Examples of such computer systems or electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

EXAMPLE EMBODIMENTS

The following examples pertain to further embodiments. Specifics in the examples may be used anywhere in one or more embodiments.

Example 1 is a processor including a decode unit to decode a modular exponentiation with obfuscated input information instruction. The modular exponentiation with obfuscated input information instruction to indicate a plurality of source operands that are to store input information for a modular exponentiation operation. At least some of the input information that is to be stored in the plurality of source operands is to be obfuscated. The processor also includes an execution unit coupled with the decode unit. The execution unit, in response to the modular exponentiation with obfuscated input information instruction, is to store a modular exponentiation result in a destination storage location that is to be indicated by the modular exponentiation with obfuscated input information instruction.

Example 2 includes the processor of Example 1, in which the decode unit is to decode the instruction that is to indicate the plurality of source operands which are to store at least one of an obfuscated exponent, an obfuscated base, and an obfuscated modulus.

Example 3 includes the processor of Example 1, in which the decode unit is to decode the instruction that is to indicate the plurality of source operands which are to store one of a reduction constant and an obfuscated reduction constant. The reduction constant is defined by a reduction algorithm for modular exponentiation and is derivable from a modulus.

Example 4 includes the processor of Example 1, in which the decode unit is to decode the instruction that is to indicate the plurality of source operands which are to store an obfuscated secret input parameter and a non-obfuscated public input parameter.

Example 5 includes the processor of Example 1, in which the decoder is to decode the instruction that is to have at least one field to indicate whether a corresponding portion of the input information for the modular exponentiation operation is obfuscated.

Example 6 includes the processor of Example 1, further including a secret that is not readable by software. Also, the decode unit is to decode the instruction that is to indicate the obfuscated input information from which corresponding input information, on which the modular exponentiation result is based, cannot be derived without the secret of the processor that is not readable by the software.

Example 7 includes the processor of Example 1, further including a secret key of the processor that is not readable by software. Also, the decode unit is to decode the instruction that is to indicate the obfuscated input information which is to include encrypted input information that is to be decrypted with the secret key of the processor that is not readable by the software.

Example 8 includes the processor of Example 1, in which the decode unit is to decode the instruction that is to indicate the obfuscated input information which is to comprise a value that is to indicate one of a plurality of sets of secret non-obfuscated input information which is to be one of: stored on the processor and not readable by software; and generated on the processor and not readable by software.

Example 9 includes the processor of Example 8, in which the value is to be one of an index that is to be used to select the set of secret non-obfuscated input information, a number that is to be used to select the set of secret non-obfuscated input information, and an identifier of the set of secret non-obfuscated input information.

Example 10 includes the processor of Example 1, in which the decode unit is to decode the instruction that is to have at least one field that is to be used to determine a size of the source operands as being one of a plurality of different possible sizes.

Example 11 includes the processor of Example 10, in which the decode unit is to decode the instruction that is to have a size indication field that is to be used to determine a base size, and a triple size indication field that is to indicate whether the base size is to be tripled to determine the size of the source operands.

Example 12 includes the processor of any one of Examples 1 to 11, in which the execution unit, in response to a second instance of the modular exponentiation with obfuscated input information instruction, is to detect a failure in an attempt to de-obfuscate an obfuscated input information, and signal a fault.

Example 13 includes the processor of any one of Examples 1 to 11, in which the execution unit, in response to a second instance of the modular exponentiation with obfuscated input information instruction, is to stop performing the second instance of the modular exponentiation with obfuscated input information instruction after an interruption, encrypt an intermediate state associated with the interrupted performance of the second instance of the modular exponentiation with obfuscated input information instruction with a secret key of the processor that is not readable by software, and store the encrypted intermediate state in a storage location.

Example 14 includes the processor of any one of Examples 1 to 11, in which the execution unit, in response to a second instance of the modular exponentiation with obfuscated input information instruction, is to stop performing the second instance of the modular exponentiation with obfuscated input information instruction after an interruption, and discard an intermediate state associated with the interrupted performance of the second instance of the modular exponentiation with obfuscated input information instruction.

Example 15 includes the processor of any one of Examples 1 to 11, in which the decode unit is to decode the instruction that is to indicate a plurality of registers of the processor, and in which each of the registers is to store a pointer to a location in a memory that is to store a corresponding one of the plurality of source operands.

Example 16 includes the processor of any one of Examples 1 to 11, in which the modular exponentiation result is to represent a remainder when a base is raised to an exponent to generate an exponentiation result, and the exponentiation result is divided by a modulus.

Example 17. A method in a processor including receiving a modular exponentiation with obfuscated input information instruction. The modular exponentiation with obfuscated input information instruction indicating a plurality of source operands storing input information for a modular exponentiation operation. At least some of the input information stored in the plurality of source operands is obfuscated. The method also includes storing a modular exponentiation result, in a destination storage location indicated by the modular exponentiation with obfuscated input information instruction, in response to the modular exponentiation with obfuscated input information instruction.

Example 18 includes the method of Example 17, further including de-obfuscating said at least some of the input information that is obfuscated with a secret that is available to a processor but is not readable by software.

Example 19 includes the method of Example 17, in which receiving includes receiving the instruction that indicates the source operands that store at least one of an obfuscated exponent, an obfuscated base, and an obfuscated modulus.

Example 20 includes the method of Example 17, in which receiving includes receiving the instruction that indicates the source operands that store at least one of a reduction constant and an obfuscated reduction constant. The reduction constant is defined by a reduction algorithm for modular exponentiation and is derivable from a modulus.

Example 21 includes the method of Example 17, in which receiving includes receiving the instruction that has at least one field that indicates whether a corresponding portion of the input information for the modular exponentiation operation is obfuscated.

Example 22 is a system to process instructions including an interconnect, and a processor coupled with the interconnect. The processor is to receive a modular exponentiation with obfuscated input information instruction that is to indicate a plurality of source operands that are to store input information for a modular exponentiation operation. At least some of the input information that is to be stored in the plurality of source operands is to be obfuscated. The processor, in response to the instruction, is to store a modular exponentiation result in a destination storage location that is to be indicated by the modular exponentiation with obfuscated input information instruction. A dynamic random access memory (DRAM) is coupled with the interconnect. The DRAM storing instructions including a plurality of different instances of the modular exponentiation with obfuscated input information instruction that each indicate a respective plurality of source operands in which each set of source operands are to store different types of obfuscated input information for the different instances of the modular exponentiation with obfuscated input information instruction.

Example 23 includes the system of Example 22, in which the processor is to receive the instruction that is to indicate the plurality of source operands which are to store at least one of an obfuscated exponent, an obfuscated base, and an obfuscated modulus.

Example 24 is an article of manufacture including a non-transitory machine-readable storage medium. The non-transitory machine-readable storage medium storing a modular exponentiation with obfuscated input information instruction. The modular exponentiation with obfuscated input information instruction to indicate a plurality of source operands that are to store input information for a modular exponentiation operation. At least some of the input information is to be obfuscated. The modular exponentiation with obfuscated input information instruction if performed by a machine is to cause the machine to perform operations including store a modular exponentiation result in a destination storage location that is to be indicated by the modular exponentiation with obfuscated input information instruction.

Example 25 includes the article of manufacture of Example 24, in which the processor is to receive the instruction that is to have at least one field to indicate whether a corresponding portion of the input information for the modular exponentiation operation is obfuscated.

Example 26 includes the processor of any one of Examples 1 to 11, further including an optional branch prediction unit to predict branches, and an optional instruction prefetch unit, coupled with the branch prediction unit, the instruction prefetch unit to prefetch instructions including the modular exponentiation with obfuscated input information instruction. The processor may also optionally include an optional level 1 (L1) instruction cache coupled with the instruction prefetch unit, the L1 instruction cache to store instructions, an optional L1 data cache to store data, and an optional level 2 (L2) cache to store data and instructions. The processor may also optionally include an instruction fetch unit coupled with the decode unit, the L1 instruction cache, and the L2 cache, to fetch the modular exponentiation with obfuscated input information instruction, in some cases from one of the L1 instruction cache and the L2 cache, and to provide the modular exponentiation with obfuscated input information instruction to the decode unit. The processor may also optionally include a register rename unit to rename registers, an optional scheduler to schedule one or more operations that have been decoded from the modular exponentiation with obfuscated input information instruction for execution, and an optional commit unit to commit execution results of the modular exponentiation with obfuscated input information instruction.

Example 27 includes a system-on-chip that includes at least one interconnect, the processor of any one of Examples 1 to 11 coupled with the at least one interconnect, an optional graphics processing unit (GPU) coupled with the at least one interconnect, an optional digital signal processor (DSP) coupled with the at least one interconnect, an optional display controller coupled with the at least one interconnect, an optional memory controller coupled with the at least one interconnect, an optional wireless modem coupled with the at least one interconnect, an optional image signal processor coupled with the at least one interconnect, an optional Universal Serial Bus (USB) 3.0 compatible controller coupled with the at least one interconnect, an optional Bluetooth 4.1 compatible controller coupled with the at least one interconnect, and an optional wireless transceiver controller coupled with the at least one interconnect.

Example 28 is a processor or other apparatus to perform or operative to perform the method of any one of Examples 17 to 21.

Example 29 is a processor or other apparatus that includes means for performing the method of any one of Examples 17 to 21.

Example 30 is an article of manufacture that includes an optionally non-transitory machine-readable medium, which optionally stores or otherwise provides an instruction, which if and/or when executed by a processor, computer system, electronic device, or other machine, is operative to cause the machine to perform the method of any one of Examples 17 to 21.

Example 31 is a processor or other apparatus substantially as described herein.

Example 32 is a processor or other apparatus that is operative to perform any method substantially as described herein.

Example 33 is a processor or other apparatus to perform (e.g., that has components to perform or that is operative to perform) any modular exponentiation with obfuscated input information instruction substantially as described herein.

What is claimed is:

1. A processor comprising:
a decode unit to decode a modular exponentiation instruction, wherein the modular exponentiation instruction indicates a plurality of source operands that are to store input information for a modular exponentiation operation, wherein the input information in the plurality of source operands comprises an obfuscated first portion derived from a first value that is to be used in the modular exponentiation operation; and
an execution unit coupled with the decode unit, wherein the execution unit is to execute the modular exponentiation instruction to:
cause a de-obfuscation unit to transform the obfuscated first portion of the input information into the first value;

perform the modular exponentiation operation using the first value derived by transforming the obfuscated first portion of the input information to generate a modular exponentiation result; and store the modular exponentiation result in a destination storage location, wherein the destination storage location is to be indicated by the modular exponentiation instruction.

2. The processor of claim 1, wherein the input information comprises at least one of an obfuscated exponent, an obfuscated base, and an obfuscated modulus.

3. The processor of claim 1, wherein the plurality of source operands comprises a reduction constant or an obfuscated reduction constant, wherein the reduction constant is defined by a reduction algorithm for modular exponentiation and is derivable from a modulus.

4. The processor of claim 1, wherein the plurality of source operands comprises an obfuscated secret input parameter and a non-obfuscated public input parameter.

5. The processor of claim 1, wherein the modular exponentiation instruction comprises at least one field to indicate whether a corresponding portion of the input information for the modular exponentiation operation is obfuscated.

6. The processor of claim 1, further comprising a secret that is not readable by software, and wherein the obfuscated first portion of the input information cannot be transformed into the first value without the secret of the processor that is not readable by the software.

7. The processor of claim 1, further comprising a secret key of the processor that is not readable by software, and wherein the decode unit is to decode the instruction that is to indicate the input information, wherein the obfuscated first portion is to be encrypted data that is transformed into the first value by the de-obfuscation unit using the secret key of the processor that is not readable by the software.

8. The processor of claim 1, wherein the input information is to comprise a second portion that is to indicate one of a plurality of sets of secret non-obfuscated input information to comprise one of: secret non-obfuscated input information stored on the processor and not readable by software; and secret non-obfuscated input information generated on the processor and not readable by software.

9. The processor of claim 8, wherein the second portion is to be one of:

an index that is to be used to select the set of secret non-obfuscated input information;

a number that is to be used to select the set of secret non-obfuscated input information; and an identifier of the set of secret non-obfuscated input information.

10. The processor of claim 1, wherein the modular exponentiation instruction comprises at least one field that is to be used to determine a size of the source operands as being one of a plurality of different possible sizes.

11. The processor of claim 10, wherein the decode unit is to decode the modular exponentiation instruction, the modular exponentiation instruction comprising:

a size indication field that is to be used to determine a base size; and a triple size indication field that is to indicate whether the base size is to be tripled to determine the size of the source operands.

12. The processor of claim 1, wherein the execution unit is to execute a second instance of the modular exponentiation instruction to:

detect a failure in an attempt to transform the obfuscated first portion into the first value, the input information comprising operands of the second instance of the modular exponentiation instruction; and signal a fault based on the failure.

13. The processor of claim 1, wherein the execution unit is to execute a second instance of the modular exponentiation instruction to:

stop performing the second instance of the modular exponentiation instruction after an interruption;

encrypt an intermediate state associated with the interrupted performance of the second instance of the modular exponentiation instruction with a secret key of the processor that is not readable by software; and store the encrypted intermediate state in a storage location.

14. The processor of claim 1, wherein the execution unit is to execute a second instance of the modular exponentiation instruction to:

stop performing the second instance of the modular exponentiation instruction after an interruption; and discard an intermediate state associated with the interrupted performance of the second instance of the modular exponentiation instruction.

15. The processor of claim 1, wherein the modular exponentiation instruction is to indicate a plurality of registers of the processor, and each of the plurality of registers is to store a pointer to a location in a memory that is to store a corresponding one of the plurality of source operands.

16. The processor of claim 1, wherein the modular exponentiation result is to represent a remainder when a base is raised to an exponent to generate an exponentiation result, and the exponentiation result is divided by a modulus.

17. The processor of claim 1, wherein the input information includes a non-obfuscated second portion that is to be used in the modular exponentiation operation, wherein the modular exponentiation operation is to be performed using the first value and the non-obfuscated second portion to generate the modular exponentiation result.

18. The processor of claim 1, wherein the execution unit circuitry is to execute the modular exponentiation instruction to:

cause the de-obfuscation unit to transform an obfuscated second portion of the input information into a second value, wherein the modular exponentiation operation is to be performed using the first value and the second value to generate the modular exponentiation result.

19. A method in a processor comprising:

receiving a modular exponentiation instruction at a decode unit of the processor, wherein the modular exponentiation instruction indicates a plurality of source operands storing input information for a modular exponentiation operation, wherein the input information stored in the plurality of source operands comprises an obfuscated first portion derived from a first value that is to be used in the modular exponentiation operation; and executing the decoded modular exponentiation instruction at execution unit circuitry of the processor to:

cause a de-obfuscation unit to transform the obfuscated first portion of the input information into the first value; and perform the modular exponentiation operation using the first value derived by transforming the obfuscated first portion of the input information to generate a modular exponentiation result; and storing the modular exponentiation result, in a destination storage location indicated by the modular exponentiation instruction.

20. The method of claim 19, wherein the obfuscated first portion of the input information is obfuscated with a secret that is available to a processor but is not readable by software, and the execution unit circuitry causes the de-obfuscation unit to transform the obfuscated first portion of the input information into the first value using the secret.

21. The method of claim 19, wherein the obfuscated first portion of the input information comprises at least one of an obfuscated exponent, an obfuscated base, and an obfuscated modulus.

22. The method of claim 19, wherein the source operands comprise at least one of a reduction constant and an obfuscated reduction constant, wherein the reduction constant is defined by a reduction algorithm for modular exponentiation and is derivable from a modulus.

23. A system to process instructions comprising:
an interconnect;
a processor coupled with the interconnect, the processor to access a modular exponentiation instruction using the interconnect, wherein the modular exponentiation instruction is to indicate a plurality of source operands that are to store input information for a modular exponentiation operation, wherein the input information in the plurality of source operands comprises an obfuscated first portion derived from a first value that is to be used in the modular exponentiation operation, and the processor comprises:
a decode unit to decode the modular exponentiation instruction; and
execution unit circuitry to execute the decoded modular exponentiation instruction to:
cause a de-obfuscation unit to transform the obfuscated first portion of the input information into the first value;
perform the modular exponentiation operation using the first value derived by transforming the obfuscated first portion of the input information to generate a modular exponentiation result; and
store the modular exponentiation result in a destination storage location, wherein the destination storage location is to be indicated by the modular exponentiation instruction; and
a dynamic random access memory (DRAM) coupled with the interconnect, the DRAM storing instructions including a plurality of different instances of the modular exponentiation instruction that each indicate a respective plurality of source operands comprising different types of obfuscated portions of input information for the different instances of the modular exponentiation instruction.

24. The system of claim 23, wherein the processor is to receive the instruction that is to indicate the plurality of source operands, which are to store one or more of an obfuscated exponent, an obfuscated base, and an obfuscated modulus.

25. The system of claim 23, wherein the obfuscated first portion of the input information is obfuscated with a secret that is available to a processor but is not readable by software, and the execution unit circuitry causes the de-obfuscation unit to transform the obfuscated first portion of the input information into the first value using the secret.

* * * * *